US012555087B2

(12) United States Patent
Pan et al.

(10) Patent No.: US 12,555,087 B2
(45) Date of Patent: Feb. 17, 2026

(54) POLYMER-BASED RADIOPAQUE INK FORMULATIONS AND USES THEREOF

(71) Applicant: Walmart Apollo, LLC, Bentonville, AR (US)

(72) Inventors: Dipanjan Pan, State College, PA (US); Zachary MT Sheffield, Belcamp, MD (US); David D. Skrodzki, State College, PA (US)

(73) Assignee: Walmart Apollo, LLC, Bentonville, AR (US)

( * ) Notice: Subject to any disclaimer, the term of this patent is extended or adjusted under 35 U.S.C. 154(b) by 69 days.

(21) Appl. No.: 18/392,039

(22) Filed: Dec. 21, 2023

(65) Prior Publication Data

US 2024/0211916 A1 Jun. 27, 2024

Related U.S. Application Data

(60) Provisional application No. 63/435,091, filed on Dec. 23, 2022.

(51) Int. Cl.
*G06Q 20/20* (2012.01)
*C09D 11/037* (2014.01)
*G06K 7/10* (2006.01)

(52) U.S. Cl.
CPC ......... *G06Q 20/208* (2013.01); *C09D 11/037* (2013.01); *G06K 7/10386* (2013.01)

(58) Field of Classification Search
CPC . G06Q 20/208; C09D 11/037; G06K 7/10386
See application file for complete search history.

(56) References Cited

U.S. PATENT DOCUMENTS 5,522,921 A 6/1996 Custer
8,765,025 B2 7/2014 Wu
(Continued)

FOREIGN PATENT DOCUMENTS

CN 112194962 B 8/2021

OTHER PUBLICATIONS

Shannon, Alice, et al. "A radiopaque nanoparticle-based ink using PolyJet 3D printing for medical applications." 3D Printing and Additive Manufacturing 7.6 (2020): 259-268. (Year: 2020).*
(Continued)

*Primary Examiner* — Nathan A Mitchell
(74) *Attorney, Agent, or Firm* — Fitch, Even, Tabin & Flannery LLP

(57) ABSTRACT

In some embodiments, apparatuses and methods are provided herein useful for identifying an object using radiopaque ink. In some embodiments, a system for identifying an object comprises an object having an identifying marking formed of a radiopaque ink comprising a polymer matrix having an average molecular weight of about 1,000 g/mol to about 50,000 g/mol, and a radiopaque compound comprising one or more elements having an atomic number of 53 or greater dispersed within the polymer matrix. A control circuit causes a radiographic imaging device to irradiate the object, receives from the radiographic imaging device image data associated with the object, processes the image data to generate an x-ray image showing the identifying marking of the object, causes a display device to display the x-ray image showing the identifying marking of the object, and identifies the object based on the identifying marking of the object shown in the x-ray image.

20 Claims, 20 Drawing Sheets

(56) References Cited

U.S. PATENT DOCUMENTS

| | | | |
|---|---|---|---|
| 9,155,491 B2 | 10/2015 | Casanova | |
| 9,729,193 B2 | 8/2017 | Joshi | |
| 10,421,875 B2 | 9/2019 | Casiraghi | |
| 10,919,220 B2 | 2/2021 | Stevens | |
| 10,959,803 B2 | 3/2021 | Halpert | |
| 11,001,050 B2 | 5/2021 | Chaffins | |
| 11,028,240 B2 | 6/2021 | Lundorf | |
| 11,441,043 B2 | 9/2022 | Singh | |
| 11,481,751 B1* | 10/2022 | Chaubard | G06V 10/82 |
| 2006/0210700 A1* | 9/2006 | Lachner | A61L 29/04 |
| | | | 427/2.1 |
| 2010/0278311 A1* | 11/2010 | Hammerstrom | A61B 6/583 |
| | | | 378/163 |
| 2012/0173347 A1* | 7/2012 | De Almeida Neves | |
| | | | G06K 7/10861 |
| | | | 705/16 |
| 2014/0194733 A1* | 7/2014 | Goforth | C07F 9/94 |
| | | | 29/428 |
| 2016/0228716 A1* | 8/2016 | Schmidt | A61N 1/362 |
| 2017/0354477 A1* | 12/2017 | Ross | A61B 90/96 |
| 2021/0406487 A1* | 12/2021 | Spolzino | G06K 19/06093 |
| 2022/0079547 A1 | 3/2022 | Dikovsky | |
| 2023/0043615 A1* | 2/2023 | Saitoh | G07G 1/009 |
| 2024/0208236 A1 | 6/2024 | Pan | |
| 2024/0209227 A1 | 6/2024 | Pan | |
| 2024/0345003 A1* | 10/2024 | Purdy | G01N 23/083 |

OTHER PUBLICATIONS

"Radiopaque Solutions Announces New X-Ray Visible Bar Code Technology". Retrieved from <https://www.prweb.com/releases/radiopaque_solutions_announces_new_x_ray_visible_bar_code_technology/prweb11824717.htm>. Originally published May 2014. (Year: 2014).*

Barcode Studio—Your Barcode Creator, https://www.tec-it.com/en/software/barcode-software/barcode-creator/barcode-studio/Default.aspx , retrieved Sep. 28, 2022.

* cited by examiner

FIG. 1
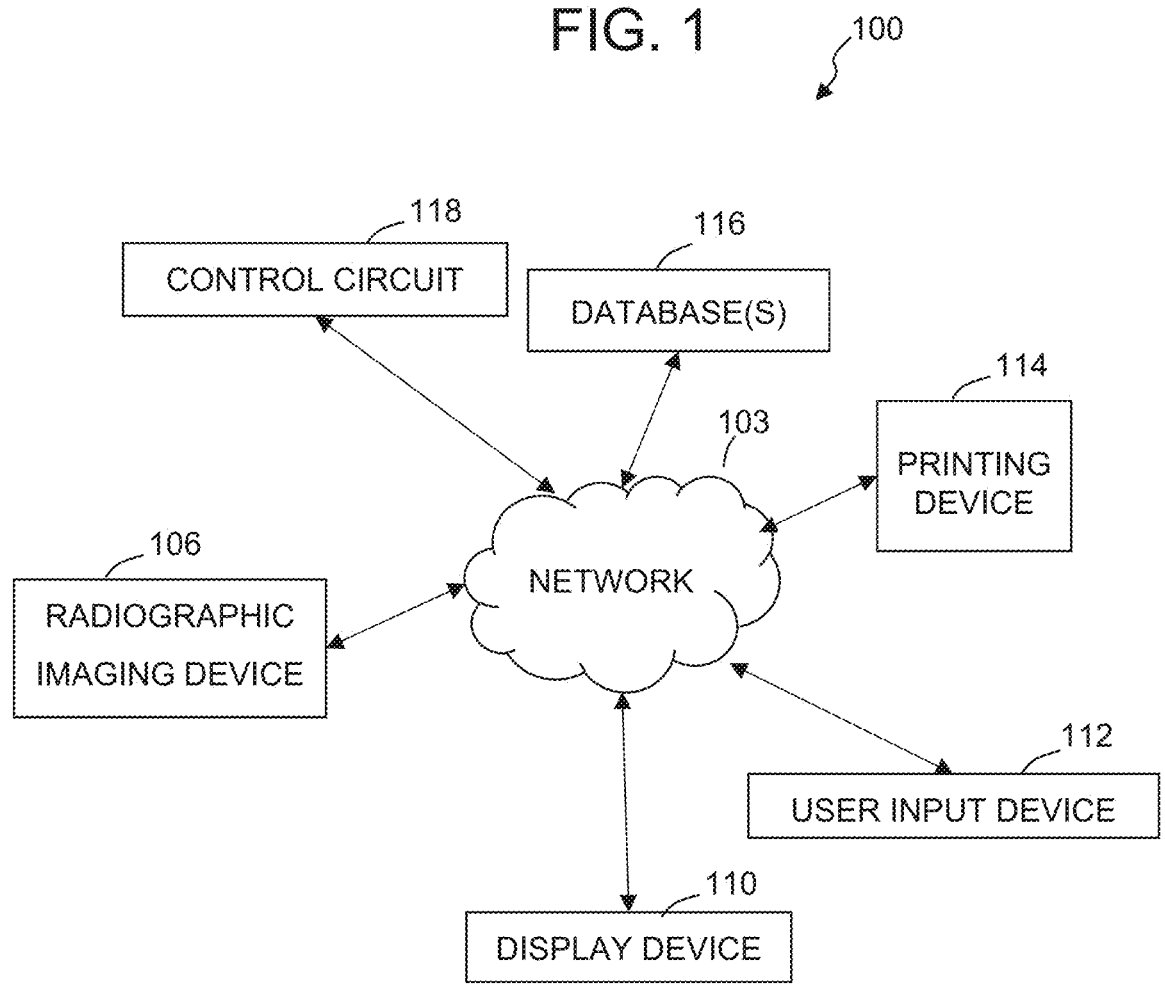
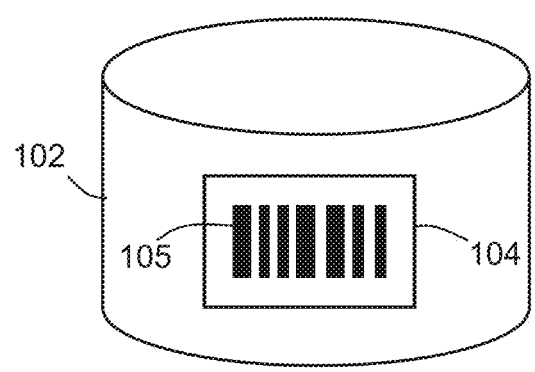

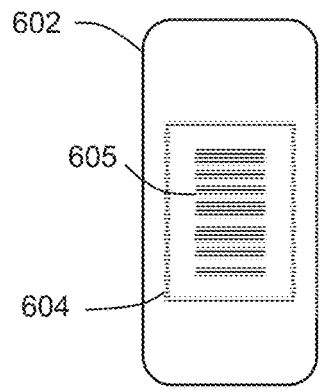
FIG. 6A
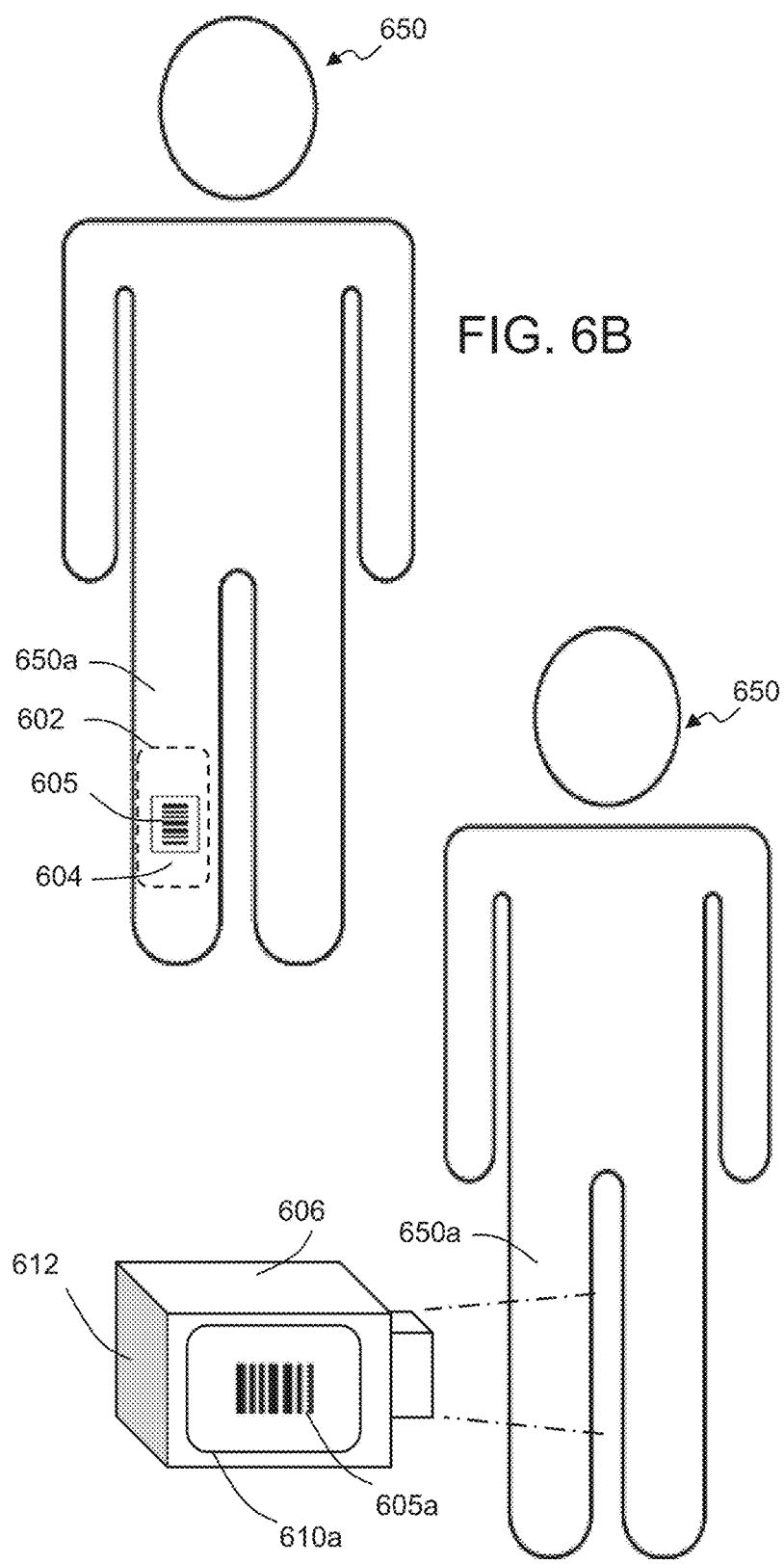
FIG. 6B
FIG. 6C

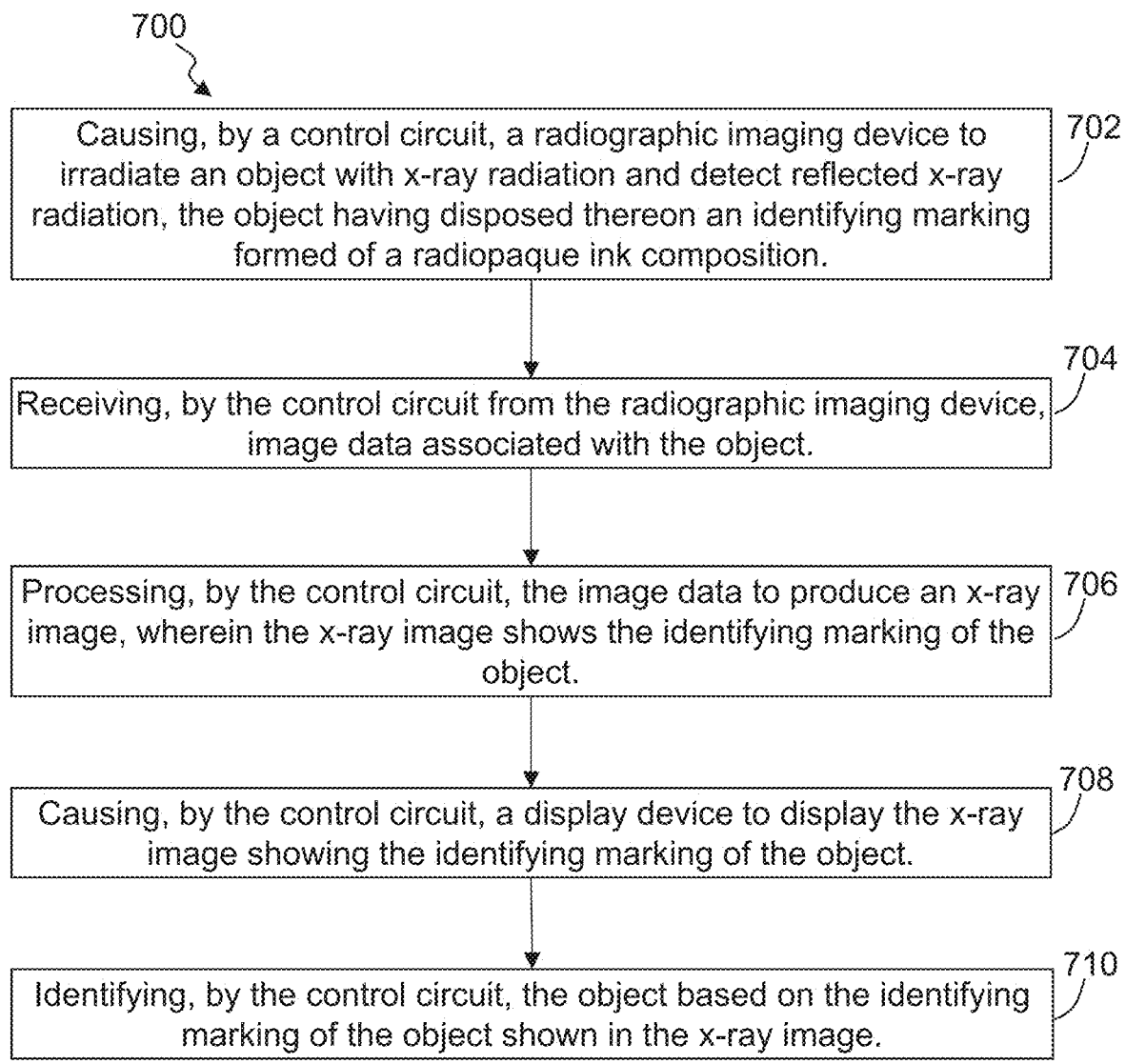

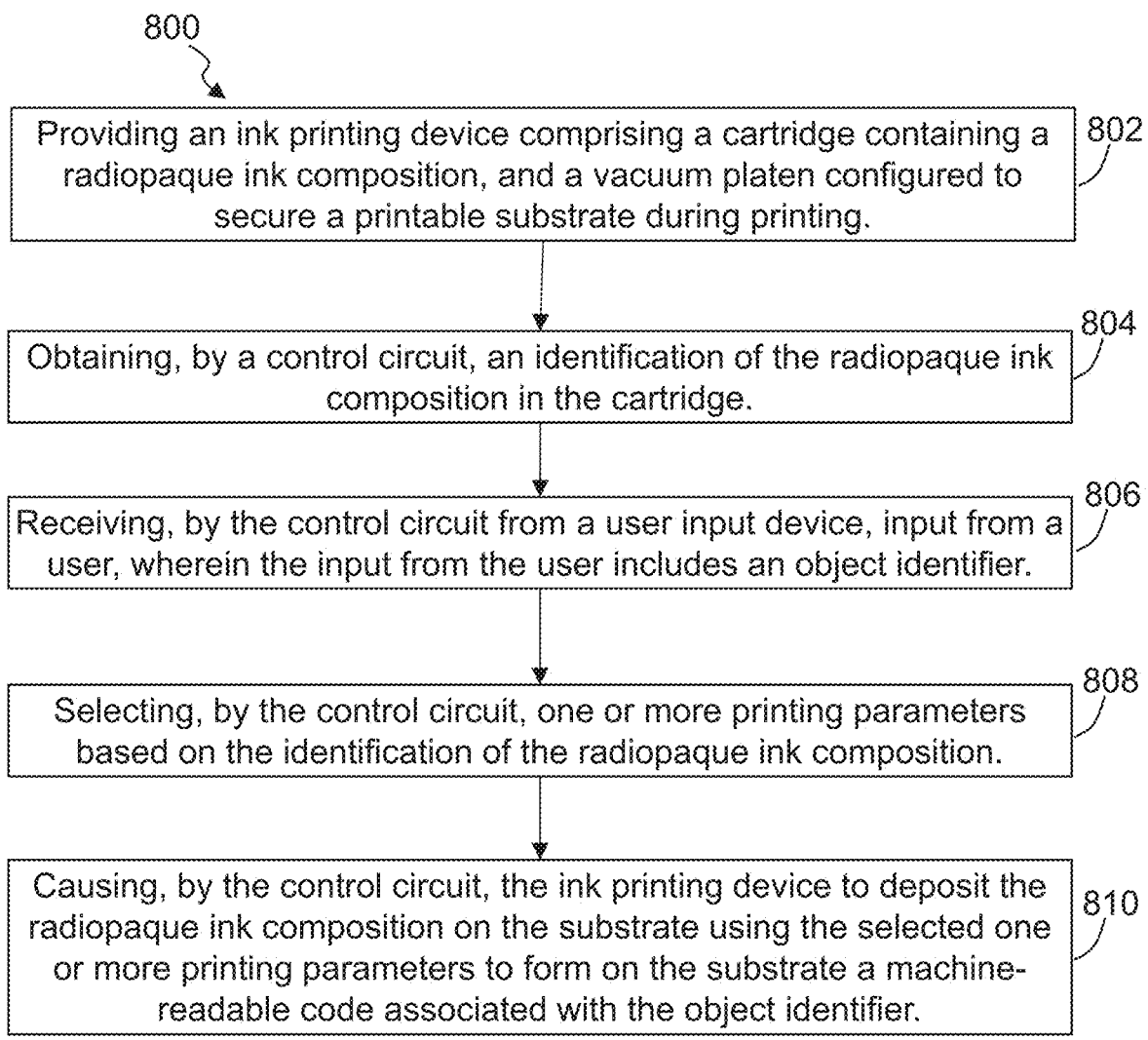

Silver ink barcodes printed using DMP-2831

DMP printed Silver ink barcodes
Barcode size ~ 8 x 4 cm
2540 dpi

Silver ink barcodes printed using DMP-2831

DMP printed Silver ink barcodes
Barcode size ~ 5 x 2.5 cm
2540 dpi

Silver Ink

DMP printed Silver ink barcodes
Barcode size ~ 8 x 4 cm
2540 dpi

Silver Ink

DMP printed Silver ink barcodes
Barcode size ~ 5 x 2.5 cm
2540 dpi

Silver Ink

DMP printed Silver ink barcodes
Barcode size ~ 5 x 2 cm
Printer resolution optimized 2540 dpi DMP-2831 – Different Substrates Barcodes on Nitrocellulose sheets DMP-2831 – Different Substrates Barcodes on calligraphy sheets DMP-2831 – Different Substrates Barcodes on A4 sheets Barcode on Glossy sheet Barcode Sizes printed using DM-2831

Waveform for Bismuth Neodecanoate Ink

Waveform for Silver Ink

POLYMER-BASED RADIOPAQUE INK FORMULATIONS AND USES THEREOF

CROSS-REFERENCE TO RELATED APPLICATIONS

This application claims the benefit of U.S. Provisional Application No. 63/435,091, filed on Dec. 23, 2022, which is incorporated by reference in its entirety here. This application is related to the following applications, each of which is incorporated by reference in its entirety: U.S. Provisional Application No. 63/435,077 entitled SYSTEMS AND METHODS FOR PRINTING RADIOPAQUE INKS, filed on Dec. 23, 2022, and U.S. Provisional Application No. 63/435,086 entitled RADIOPAQUE INK FORMULATIONS CONTAINING NANOPARTICLES AND USES THEREOF, filed on Dec. 23, 2022.

TECHNICAL FIELD

This invention generally relates to radiopaque ink compositions, and in particular, radiopaque ink compositions suitable for use with printing devices to print radiodense machine-readable object identifiers.

BACKGROUND

In modern commercial environments, there is a need to quickly and efficiently identify and track assets. For example, in retail environments, there is a need to consistently maintain an adequate inventory of products and to efficiently process purchases at point-of-sale terminals. The need to identify and track assets is also important in medical settings, such as doctors' offices, hospitals, and even during surgical procedures.

RFID tags have previously been investigated to tag and identify products in a store, warehouse, hospital, etc. However, the use of RFID tags to identify and track items can be limited due to, for example, limited range of the tags, interference, the complexity and cost of implementation, privacy concerns, etc.

BRIEF DESCRIPTION OF THE DRAWINGS

Disclosed herein are embodiments of systems, apparatuses and methods pertaining to radiopaque ink compositions suitable for use with printing devices to print radiodense machine-readable object identifiers. This description includes drawings, wherein:

FIG. 1 is a block diagram of an exemplary system for identifying objects using radiopaque ink compositions, according to some embodiments.

FIGS. 6A, 6B, and 6C illustrate a simplified block diagram of an exemplary system for identifying a medical implant in a patient using radiopaque ink compositions with a handheld radiographic imaging device, according to some embodiments.

FIG. 7 depicts a simplified flow diagram of an exemplary process of identifying an object, in accordance with some embodiments.

FIG. 8 depicts a simplified flow diagram of an exemplary process of printing a radiopaque ink composition on a substrate, in accordance with some embodiments.

Figure 2:
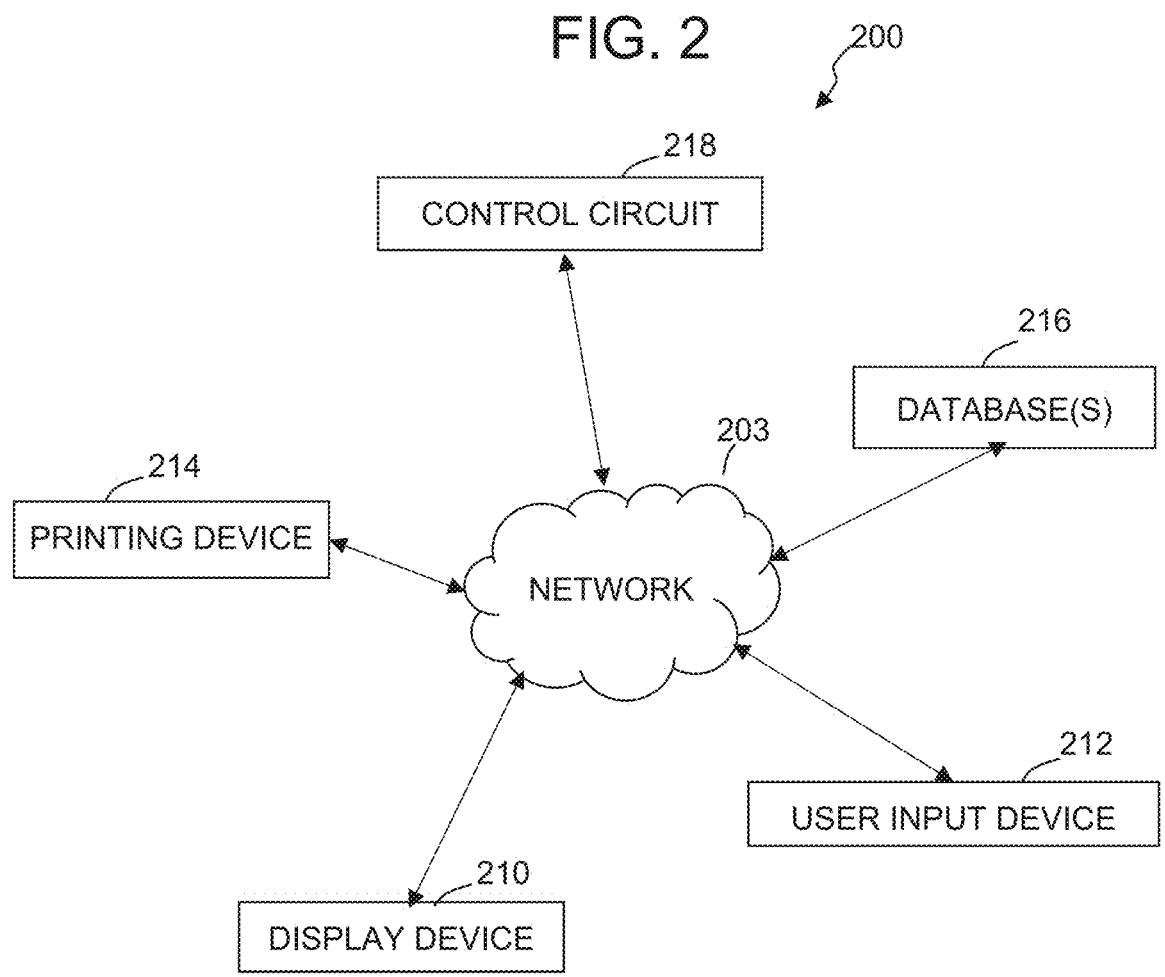
FIG. 2 is a block diagram of an exemplary system for printing a radiopaque ink composition on a substrate, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, methods, and compositions are provided herein useful for identifying an object using radiopaque ink compositions. The radiopaque ink compositions described herein are especially useful in systems and methods for tracking and identifying objects having identifying markings formed of the radiopaque ink compositions. As used herein, the term "radiopaque" refers to materials that inhibit the passage of x-rays or similar radiation. Conversely, materials through which x-rays or similar radiation can pass through more freely are referred to as "radiolucent." For example, radiopaque material appears white on x-ray images or radiographs, while radiolucent material appears darker on x-ray images, providing visual contrast between materials having different radiodensities.

Described herein are embodiments of formulations for radiopaque ink compositions, which are especially suitable for use with an ink printer, such as an inkjet printer or similar printing device. The radiopaque inks described herein may also be suitable for use in a laser engraving system and/or a laser engraving process. According to some embodiments, the radiopaque ink compositions described herein generally include radiopaque or radiodense compounds which have been effectively solubilized to achieve a particular viscosity, rendering the inks suitable for use with an ink printer or similar printing device. The radiopaque compounds used in the inks described herein are formed of atoms having an atomic number of 53 or greater. The radiopaque ink compositions may be printed on a substrate, which may be affixed to an object. For example, product identifications may be printed on adhesive labels and affixed to products for sale (and/or on product packaging) in a retail facility, such as a product for commercial sale. In another example, the product identifications may be printed directly to the objects without being first printed onto a label. In another example, an identification may be printed on a biocompatible substrate and affixed to a medical implant. A radiographic (i.e., x-ray) imager can then be used to view the labels on the objects and read the radiodense identifications, even when objects having the labels affixed thereto are visually obscured by other objects or material.

In some approaches, the radiographic inks described herein may be useful for marking radiological or fluoroscopic objects in order to inhibit or prevent x-rays from passing through them and may be used to mark incision sites during fluoroscopic procedures. The radiopaque inks described herein may also improve the accuracy of treatment by inhibiting systematic setup errors in standard radiological procedures. In addition to health and retail applications, the radiopaque inks described herein may also be useful in systems, applications, and industries relating to security, biometry, transportation.

In some embodiments, the radiopaque ink compositions may comprise an amount of one or more radiopaque compounds dispersed within a polymer matrix. The one or more radiopaque compounds are generally formed of atoms having an atomic number of 53 or greater to ensure sufficient radiodensity and the atoms are present in a sufficient amount so that the ink is effective as a radiocontrast agent. In some approaches, the one or more compounds may include, but are not limited to, heavy metal compounds, organometallic compound, metallic salts, and iodinated media.

In some approaches, the one or more compounds may include, but are not limited to, gold chloride, silver chloride, ytterbium chloride, barium sulfate, bismuth neodecanoate, triphenyl bismuth, gadolinium acetylacetonate, barium sulphate, europium, trifluoromethanesulfonate, as well as iodinated organically soluble media, including, but not limited to, diatrizoate, ioxaglate, iothalamate, metrizoate, ioxaglate, iopamidol, ioxilan, and iodixanol.

As discussed above, the one or more compounds are dispersed in a polymer matrix. The polymer matrix generally has an average molecular weight of from about 1,000 g/mol to about 50,000 g/mol, and in some approaches an average molecular weight up to 25,000 g/mol to ensure a suitable density and viscosity and a suitable radiodensity. In some approaches, the polymer matrix may include one or more branched, one or more linear short-chain polymers, or a mixture of both branched and linear short-chain polymers.

The polymer may include a synthetic polymer, a semi-synthetic polymer, a natural polymer, or a combination thereof. Non-limiting examples of suitable polymers include, but are not limited to, polyacrylate, polyacrylamide, polyacrylamide sulphonic acid, polyacrylonitrile, polyamines, polyamides, polyamidoamine (PAMAM), polybutadiene, polydimethylsiloxane, polyester, polyether, polyethylene, polyethylene glycol (PEG), polyethyleneimine (PEI), polyethyleneoxide, polyethyleneglycol, polyethyloxazoline, polyhydroxyethylacrylate, polyisoprene, polymethacrylate, polymethacrylamide, polymethylmethacrylate, polymethyloxazoline, polyoxyalkylene oxide, polyphenylene, polypropyleneimine, polypropylene oxide, polystyrene, polyurethane, polyvinyl alcohol, polyvinylpyrrolidone, methylcellulose, carboxymethylcellulose, hydroxyethylcellulose, hydroxypropylcellulose, hydroxypropylmethylcellulose, hyaluronic acid, dextran, dextrin, heparan sulfate, chondroitin sulfate, heparin, alginate, agar, carrageenan, xanthan, guar, polyamino acids (such as e.g., polylysine, polyglycine, and polyserine), co-polymers, and combinations thereof.

In some embodiments, the radiopaque ink compositions may comprise a plurality of nanoparticles suspended in a solvent. In some approaches, the solvent may include one or more of toluene, ethyl acetate, and isopropanol. The nanoparticles suspended in the solvent are generally formed of one or more radiodense compounds containing one or more elements having an atomic number of 53 or greater. In some approaches, each nanoparticle comprises at least 50,000, in some approaches at least about 100,000, in some approaches at least about 200,000 and in some approaches at least about 500,000, atoms having an atomic number of 53 or greater such that the nanoparticles render the ink effective as a radiographic contrast agent. In some approaches, the nanoparticles may have an average diameter from about 5 nm to about 300 nm.

As discussed above, the nanoparticles compounds contain a sufficient amount of atoms having an atomic number of 53 or greater. In some approaches, the nanoparticles may be metal nanoparticles formed of metal compounds, which may include, but are not limited to, metal oxides, metal sulphides, metal phosphates, metal carbonates, and metal chromates. Further examples of suitable metal compounds include organo-metal (or organometallic) compounds, organo-coated metal compounds, or spinels. In some embodiments, non-limiting examples of organometallic compounds may include metal polysorbate compounds, metal fatty acid compounds, metal surfactant compounds, metal aliphatic acid compounds, metal aromatic hydrophobic compounds, and combinations thereof. In some approaches, the nanoparticles may be formed of one or more of bismuth neodecanoate, triphenyl bismuth, gadolinium acetylacetonate, barium sulphate, europium, trifluoromethanesulfonate, bismuth oxide, titanium oxide, gadolinium oxide, ytterbium oxide, tungsten oxide, gold, and silver.

In some approaches, the nanoparticles may include non-metallic compounds, provided the compounds include a sufficient number of non-metal atoms having an atomic number of 53 or greater effective to render the ink radiopaque. For example, the nanoparticles may include iodinated organically soluble media, such as, but not limited to, one or more of diatrizoate, ioxaglate, iothalamate, metrizoate, ioxaglate, iopamidol, ioxilan, and iodixanol.

In some approaches, the ink compositions may include one or more viscosity-adjusting agents to ensure the viscosity of the ink is suitable for printing. Exemplary suitable viscosity-adjusting agents may include, but are not limited to, acacia, agar, alginic acid, aluminum mono-stearate, bentonite, magma, carbomer 934P, carboxymethylcellulose, calcium and sodium and sodium 12, carrageenan, cellulose, dextrin, gelatin, guar gum, hydroxyethyl cellulose, hydroxypropyl methylcellulose, magnesium aluminum silicate, methylcellulose, pectin, polyethylene oxide, polyvinyl alcohol, povidone, propylene glycol alginate, silicon dioxide, sodium alginate, tragacanth, and xanthan gum.

The radiopaque ink compositions described herein may have a viscosity of at least about 2 centipoise and up to about 12 centipoise, rendering the ink effective for use in ink printing applications. In some approaches, it is preferable that the ink compositions are fluid, and maintain their fluidity, at ambient temperatures.

As described above, some embodiments of the radiopaque ink compositions described herein are especially suitable for use in systems and methods for identifying objects having disposed thereon identifying markings formed of the radiopaque ink compositions. In some approaches, the identifying markings be in the form of text, symbols, etc. In some approaches, the identifying markings may form computer readable markings, such as QR codes, barcodes, and the like. Any suitable code, whether linear or matrix, may be used, including, but not limited to, UPC, EAN, Code 39, Code 128, ITF, Code 93, Codabar, GS1 Databar, MSI Plessy, QR, Data Matrix, PDF417, Aztec, etc. ~50. In some embodiments, the identifying markings printed on the substrate have a Hounsfield value of up to about 1,000 Hounsfield Units when scanned with a suitable radiographic imaging device.

Exemplary systems for identifying an object may further include a radiographic imaging device configured to irradiate an object with x-ray radiation and detect reflected x-ray radiation. In some embodiments, the radiographic imaging device may comprise a handheld device or portable configured to be operated by user, such as, for example, a store associate in a retail facility, a worker in a distribution or fulfillment center, or a technician or physician in a medical office. In some embodiments, the radiographic imaging device may be associated with a point-of sale terminal, inventory monitoring device, conveyor, fixed location product monitoring system, or an autonomous robot in a retail facility, for example. In some approaches, the radiographic imaging device may be a full length and/or a full-sized imaging device, which may be located in a fixed location rather than being portable.

Exemplary systems may further include a display device, which may display the x-ray image showing the radiodense identifying marking on the object. The display device may also display additional information about the object associated with the identifying marking.

Exemplary systems may further include a control circuit communicatively coupled to the radiographic imaging device and the display device via a network, the control circuit configured to cause the radiographic imaging device to irradiate the object with x-ray radiation and detect reflected radiation. The control circuit may be further configured to receive, from the radiographic imaging device, image data associated with the object, and process the image data to produce an x-ray image, wherein the x-ray image shows the radiodense identifying marking of the object. The control circuit may then cause the display device to display the x-ray image showing the identifying marking of the object and may identify the object based on the identifying marking of the object shown in the x-ray image. In some embodiments, exemplary systems may further comprise a database configured to associate objects with respective identifying markings, and the control circuit may be configured to identify a particular object by reading the identifying marking of the object in the x-ray image and querying the database to obtain a match between the identifying marking and the associated object.

As described above, some embodiments of the radiopaque ink compositions described herein are especially suitable for use with ink printers such as inkjet printers, and similar printing devices. An exemplary system for printing the radiopaque ink compositions on a substrate may include a printable substrate and an ink printing device. In some embodiments, the substrate may have a maximum thickness of about 25 millimeters. The ink printing device may include a cartridge containing a radiopaque ink composition, such as a piezo inkjet cartridge. In some approaches, the radiopaque ink composition may have a minimum viscosity of about 2 centipoise and maximum viscosity of about 12 centipoise and/or may maintain its fluidity at ambient temperatures. In some embodiments, the ink printing device may further include a vacuum platen or similar device configured to secure the substrate during printing. In some embodiments, the temperature of the vacuum platen during printing is no more than about 60° C., and in some approaches from about 40° C. to about 60° C.

In some embodiments, exemplary printing systems may further include a user input device configured to accept input from a user. For example, the user input device may be used by a user to input product information, cause product information to be retrieved and provided, select printing parameters, etc. In some embodiments, the ink printing device may receive this or other information from a database, backend system, other computer system or the like, with or without user input. Exemplary printing systems may also include a display device configured to display, for example, printing options, user selections, status identifiers, error codes, etc. In some embodiments, the user input device and/or the display device may form part of the printing device. In other embodiments, these components may be separate from the printing device.

Exemplary printing systems may further include a control circuit communicatively coupled to the ink printing device, (and, in some approaches, the user input device and/or the display device). The control circuit may be configured to receive an object identifier and may select one or more printing parameters. In some embodiments, the one or more printing parameters may include at least one of waveform shape, waveform amplitude, slew rate, duration, and drop spacing. One of the one or more printing parameters may be selected, for example, based on a concentration of metal or other radiodense compound in the radiopaque ink composition. In some approaches, the control circuit may be configured to obtain an identification of the radiopaque ink composition in the cartridge and one or more printing parameters may be selected, for example, based on the identification of the radiopaque ink composition. The control circuit may be further configured to cause the ink printing device to deposit the radiopaque ink composition on the substrate using the selected one or more printing parameters to form on the substrate a machine-readable code associated with the object identifier. In some embodiments, the machine-readable code may be printed on the substrate at a resolution of from about 2400 dpi to about 2600 dpi, and in some approaches at a resolution of about 2450 dpi.

In some embodiments, the machine-readable code may have a length of about 3 cm to about 10 cm and a width of about 1 cm to about 6 cm. In some non-limiting approaches, suitable machine-readable codes may have the following dimensions: 8×4 cm, 8×3 cm, 5×2 cm, 4.5×2.5 cm, 5×2 cm, and/or 3×1 cm. It is understood that the dimensions of the machine-readable code will vary depending on the application, and that ink formulations described herein may be applied to variously sized codes and substrates.

As described herein, in some embodiments, the machine-readable code printed on the substrate is radiodense and, therefore, may be detected or otherwise viewed using a radiographic imaging device. In some approaches, the machine-readable code printed on the substrate may be also visible to a human. For example, the ink radiodense contrast agent(s) in radiopaque inks may be naturally pigmented. In other examples, the radiodense inks may include one or more added pigments so that they are visible against the substrate without the aid of an imaging device. In this way, the radiodense machine-readable codes may also be readable using a traditional optical reader.

In some approaches, the radiopaque inks described herein may be used in conjunction with a laser engraving/cutting system. For example, the system may be equipped with a $CO_2$ laser source or a fiber optic source, depending on the substrate. Exemplary substrates may include, but are not limited to wood, paper, cork, plastic, rubber, polyetherimide (PEI), cardboard, aluminum, stainless steel, glass, etc. In some approaches, the laser parameters may be dependent on the utilized substrate. For instance, in one non-limiting example, a plastic sheet was used as a substrate and a barcode was engraved using a power of 30%, a speed of 5.8 cm/sec, and 1000-2000 pulses/inch. Any suitable laser engraving system or device can be used. In one non-limiting example, a laser system by Universal Laser System, Inc. with a $CO_2$ laser was used to cut a variety of materials.

FIG. 1 is a block diagram of an exemplary system 100 for identifying objects using radiopaque ink compositions, according to some embodiments. The system 100 may include a radiographic imaging device 106, a display device 110, a user input device 112, a printing device 114, one or more databases 116, and a control circuit 118. The radiographic imaging device 106, the display device 110, the user input device 112, the printing device 114, the one or more databases 116, and the control circuit 118 may be communicatively coupled via a network 103. Accordingly, the network 103 can be of any suitable type. For example, the network 103 can include a local area network (LAN) and/or wide area network (WAN), such as the internet. The network 103 can include wired and/or wireless links.

The system further includes one or more objects 102 having disposed thereon a radiodense identifying marking 105 formed of a radiopaque ink printed on a substrate 104. The substrate 104 can be any substrate suitable for printing including, but not limited to, paper (including glossy and matte), nitrocellulose, plastic films, textiles, vinyl, canvas, etc. In some embodiments, the substrate may be biocompatible, rendering it suitable for use on a medical implant device. In some approaches, the radiodense identifying markings 105 may be printed on a surface of the objects 102 themselves. In other approaches, the radiodense identifying markings 105 may be printed on outer packaging associated with the objects 102. The radiodense identifying markings 105 can also be printed on adhesive labels, which may then be affixed to the objects and/or the objects' packaging.

The radiodense markings may denote an identification of the object. For example, the radiodense markings may include machine-readable markings, such as barcodes (as shown in FIG. 1) and described herein, QR codes, and the like. The radiodense markings may further include words, symbols, shapes, or any markings that may be used to identify the object. Since the markings are radiodense, they will be visible on an x-ray image or radiograph and may be detected by the radiographic imaging device 106 even when the markings are visually obscured, provided the material obscuring the marking is less radiodense than the markings themselves.

In some embodiments, the radiopaque ink compositions are polymer-based compositions may comprise an amount of one or more radiopaque compounds a dispersed within a polymer matrix. The one or more radiopaque compounds are generally formed of atoms having an atomic number of 53 or greater to ensure sufficient radiodensity and the atoms are present in a sufficient amount so that the ink is effective as a radiocontrast agent. In some approaches, the one or more compounds may include, but are not limited to, heavy metal compounds, organometallic compound, metallic salts, and iodinated media. In some approaches, the one or more compounds may include, but are not limited to, gold chloride, silver chloride, ytterbium chloride, barium sulfate, bismuth neodecanoate, triphenyl bismuth, gadolinium acetylacetonate, barium sulphate, europium, trifluoromethanesulfonate, as well as iodinated organically soluble media, including, but not limited to, diatrizoate, ioxaglate, iothalamate, metrizoate, ioxaglate, iopamidol, ioxilan, and iodixanol.

The polymer matrix generally has an average molecular weight of from about 1,000 g/mol to about 50,000 g/mol, and in some approaches an average molecular weight up to 25,000 g/mol to ensure a suitable density and viscosity for printing and a suitable radiodensity. In some approaches, the polymer matrix may include one or more branched, one or more linear short-chain polymers, or a mixture of both branched and linear short-chain polymers.

The polymer may include a synthetic polymer, a semi-synthetic polymer, a natural polymer, or a combination thereof. Non-limiting examples of suitable polymers include, but are not limited to, polyacrylate, polyacrylamide, polyacrylamide sulphonic acid, polyacrylonitrile, polyamines, polyamides, polyamidoamine (PAMAM), polybutadiene, polydimethylsiloxane, polyester, polyether, polyethylene, polyethylene glycol (PEG), polyethyleneimine (PEI), polyethyleneoxide, polyethyleneglycol, polyethyloxazoline, polyhydroxyethylacrylate, polyisoprene, polymethacrylate, polymethacrylamide, polymethylmethacrylate, polymethyloxazoline, polyoxyalkylene oxide, polyphenylene, polypropyleneimine, polypropylene oxide, polystyrene, polyurethane, polyvinyl alcohol, polyvinylpyrrolidone, methylcellulose, carboxymethylcellulose, hydroxyethylcellulose, hydroxypropylcellulose, hydroxypropylmethylcellulose, hyaluronic acid, dextran, dextrin, heparan sulfate, chondroitin sulfate, heparin, alginate, agar, carrageenan, xanthan, guar, polyamino acids (such as e.g., polylysine, polyglycine, and polyserine), co-polymers, and combinations thereof.

The radiodense compound should be sufficiently solubilized in the polymer matrix and in a concentration effective to obtain a viscosity suitable for use with printing devices, such as inkjet printers, while maintaining sufficient radiopacity so that the radiodense markings are readable in an x-ray image. In some approaches, the ink composition may have a viscosity of at least about 2 centipoise and up to about 12 centipoise.

In some approaches, the ink compositions may include one or more viscosity-adjusting agents to ensure the viscosity of the ink is suitable for printing. Exemplary suitable viscosity-adjusting agents may include, but are not limited to, acacia, agar, alginic acid, aluminum mono-stearate, bentonite, magma, carbomer 934P, carboxymethylcellulose, calcium and sodium and sodium 12, carrageenan, cellulose, dextrin, gelatin, guar gum, hydroxyethyl cellulose, hydroxypropyl methylcellulose, magnesium aluminum silicate, methylcellulose, pectin, polyethylene oxide, polyvinyl alcohol, povidone, propylene glycol alginate, silicon dioxide, sodium alginate, tragacanth, and xanthan gum.

In some approaches, the ink compositions may be visible by a human and/or other visible light optical readers. For example, tungsten hexachloride is generally a blue-black color at room temperature. Thus, the radiodense markings may also be visible by a human and other visible light optical readers provided there is sufficient contrast between the markings and the substrate. The radiodense markings being visible without the use of a radiographic imaging device allows a person to read the marking without the need for a radiographic imaging device when the marking is not obscured, while still being able to read the marking using a x-ray imager when the marking is obscured. For example, in some cases, the marking may be visible through a container (e.g., box, carton, crate, pallet) containing an object having the marking.

In one non-limiting example, a tungsten hexachloride metal-polymer ink composition was prepared as follows:
1. 0.2 g short-chain PEI is added to a 20 mL glass vial;
2. 0.4 g branched PEI is added to the same vial;
3. 4 mL deionized water is added to the vial;
4. Sample is sonicated and vortexed until all PEI is dissolved in the deionized water;
5. 2 g $WCl_6$ is added slowly to solution while being cooled in ice;
6. Final product is obtained after sonication and vortexing until solution is homogeneous.

The ink was then deposited into a 3D mold of a desired barcode using a pipette before being placed in an oven to dry. After removing the mold from the oven, a damp cloth was used to remove any excess ink from the template face and smooth out the barcode.

In another embodiment, the radiopaque ink compositions may contain a plurality of radiodense nanoparticles suspended in a solvent. In some approaches, the solvent may include one or more of toluene, ethyl acetate, and isopropanol. The nanoparticles suspended in the solvent are generally formed of one or more radiodense compounds containing one or more elements having an atomic number of 53 or greater. In some approaches, each nanoparticle comprises at least 50,000, in some approaches at least about 100,000, in some approaches at least about 200,000 and in some approaches at least about 500,000, atoms having an atomic number of 53 or greater such that the nanoparticles render the ink effective as a radiographic contrast agent. In some approaches, the nanoparticles may have an average diameter from about 5 nm to about 300 nm.

In some approaches, the nanoparticles may be metal nanoparticles formed of metal compounds, which may include, but are not limited to, metal oxides, metal sulphides, metal phosphates, metal carbonates, and metal chromates. Further examples of suitable metal compounds include organo-metal (or organometallic) compounds, organo-coated metal compounds, or spinels. In some embodiments, non-limiting examples of organometallic compounds may include metal polysorbate compounds, metal fatty acid compounds, metal surfactant compounds, metal aliphatic acid compounds, metal aromatic hydrophobic compounds, and combinations thereof. In some approaches, the nanoparticles may be formed of one or more of bismuth neodecanoate, triphenyl bismuth, gadolinium acetylacetonate, barium sulphate, europium, trifluoromethanesulfonate, bismuth oxide, titanium oxide, gadolinium oxide, ytterbium oxide, tungsten oxide, gold, and silver.

In some approaches, the nanoparticles may include non-metallic compounds, provided the compounds include a sufficient number of non-metal atoms having an atomic number of 53 or greater effective to render the ink radiopaque. For example, the nanoparticles may include iodinated organically soluble media, such as, but not limited to, one or more of diatrizoate, ioxaglate, iothalamate, metrizoate, ioxaglate, iopamidol, ioxilan, and iodixanol.

The compounds should be sufficiently solubilized and in a concentration effective to obtain a viscosity suitable for use with printing devices, such as ink printers, while maintaining sufficient radiopacity so that the radiodense markings are readable in an x-ray image. For example, in some embodiments the nanoparticle ink compositions may have a viscosity of from about 2 to about 12 centipoise at ambient temperature.

In one non-limiting example, exemplary bismuth neodecanoate inks having various metal concentrations were formed by: mixing 8 mL bismuth neodecanoate in 4.5 mL toluene; mixing 8 mL bismuth neodecanoate in 10 mL toluene; mixing 5 mL bismuth neodecanoate in 10 mL toluene; and mixing 2 mL bismuth neodecanoate in 10 mL toluene. Exemplary triphenyl bismuth inks having various metal concentrations were formed by: mixing 1.5 g triphenyl bismuth in 10 mL toluene; mixing 1 g triphenyl bismuth in 10 mL toluene; and mixing 500 mg triphenyl bismuth in 10 mL toluene. Exemplary europium trifluoromethanesulfonate inks having various metal concentrations were formed by: mixing 1.5 g europium trifluoromethanesulfonate in 10 mL isopropanol; mixing 1 g europium trifluoromethanesulfonate in 10 mL isopropanol; and mixing 500 mg europium trifluoromethanesulfonate in 10 mL isopropanol. All of the inks were subjected to vortexing for 10 mins and were then passed through a small bed of cotton and filtered using 0.2 micron filters to remove large aggregates to prevent printing clogs and to ensure the inks have a suitable viscosity for printing.

As noted above, the radiopaque ink compositions may be used with a printing device 114 to print radiodense markings 105 on a substrate 104, which may be affixed to an object 102. In some approaches, as described below with reference to FIGS. 3 to 5B, the object may be a consumer product in a retail facility. In other approaches, as described below with reference to FIGS. 6A to 6C, the object may be a medical implant implanted in a patient. The radiodense markings 105 may be printed using the system 200 described below with reference to FIG. 2.

In some approaches, the radiodense markings may form a machine-readable code, which may be read by an optical scanner. Any suitable machine-readable code, whether linear or matrix, may be used, including, but not limited to, UPC, EAN, Code 39, Code 128, ITF, Code 93, Codabar, GS1 Databar, MSI Plessy, QR, Data Matrix, PDF417, Aztec, etc. The radiodense markings may be also viewed using the radiographic imaging device 106. In this way, the radiodense markings can serve multiple purposes, depending on need, and can also be backward compatible with existing product identification systems.

In some approaches, the radiopaque inks described herein may be printed on a substrate using a Dimatix inkjet printer equipped with disposable piezo inkjet cartridges to deposit radiopaque fluidic materials on 8×11 or A4 substrates. A 200×300 mm area can be printed, which is capable of handling substrates up to 25 mm thick with an adjustable Z height. The temperature of the vacuum platen, which secures the substrate in place, may be adjusted up to 60° C. As the drop is ejected from the nozzle, a waveform editor and a drop-watch camera system can be used to modify the electronic pulses to the piezo jetting device. In one non-limiting example using this printer, the following printer parameters were selected: square waveform amplitude: 20-30% level of ON and OFF cycles; slew rate of 1.9; duration of 4-5 μsec; and drop spacing of 2540 dpi. The ink printed on the substrate had an attenuation coefficient of 400-1,000 Hounsfield Units (HU) at a thickness of about 100 micron for an x-ray having an incident intensity of 54-160 kVp and about 3.9-15 mA.

The radiographic imaging device 106 is configured to irradiate an object with x-ray radiation and detect radiation reflected by radiodense materials. Any suitable radiographic imaging device 106 capable of emitting and detecting x-rays may be used. In some embodiments, the radiographic imaging device 106 may be a backscatter x-ray imaging device configured to emit and detect x-rays. The x-ray may have an incident intensity suitable for the particular use/application. For example, the radiographic imaging device 106 may be configured to emit x-ray irradiation having an incident intensity of up to about 200 kVp, in some approaches up to 190 kVp, in some approaches up to 180 kVp, in some approaches up to 170 kVp, and in some approaches up to 160 kVp. In some approaches, the x-ray irradiation may have an incident intensity of from about 20 kVp to about 160 kVp. A radiographic imaging device 106 having lower incident intensities may be particularly suitable for use with a handheld or portable imaging device or for use in public spaces.

In some embodiments, the radiographic imaging device 106 may be incorporated in a handheld device or otherwise portable or electronic device, for example, in a retail facility. The term "retail facility" as used herein refers to any facility that sells, stores, or otherwise handles products for sale including, but not limited to, supermarkets, department stores, retail outlets, shopping centers, distribution centers, warehouses, fulfillment centers, and the like. In one non-limiting example, the radiographic imaging device 106 may be incorporated in a handheld device configured to be operated by a store associate in a retail facility, as described in more detail below with reference to FIG. 3. In some approaches, the handheld device may be further configured to read machine-readable codes, such as barcodes, QR codes, UPC codes, and the like, as described above, and even text disposed on products for sale. In some approaches, the handheld device may also be configured to capture images. In this way, a store associate can quickly and efficiently obtain information about products labeled with the radiopaque inks described herein which may be obscured by other products or objects.

In another non-limiting example, the radiographic imaging device 106 may be associated with an autonomous robot or motorized unit or vehicle in a retail facility, as described in more detail below with reference to FIG. 4. The autonomous robot may be further configured to read machine-readable codes, such as barcodes, QR codes, UPC codes, and the like, as described above, and even text disposed on products for sale, as well as capture images of its surroundings, allowing the robot to autonomously travel about the retail facility collecting information relating to, for example, products for sale, inventory, cleanliness, etc. In this way, the radiographic imaging device 106 can quickly and efficiently obtain identifications of products on a shelf labeled with the radiopaque inks described herein and use those product identifications make inventory assessments.

In yet another non-limiting example, the radiographic imaging device 106 may be associated with a point-of sale terminal in a retail facility, as described in more detail below with reference to FIGS. 5A and 5B. The point-of-sale terminal may comprise, for example, a self-service kiosk used by customers to purchase or return merchandise, or the point-of-sale terminal may be staffed by a store associate. The radiographic imaging device 106 may be positioned so that it can obtain x-ray images of products, for example, on traveling a conveyor or stacked in a shopping cart. In this way, the radiographic imaging device 106 can quickly and efficiently obtain identifications of products labeled with the radiopaque inks described herein during checkout.

In another non-limiting example, the radiographic imaging device 106 may be associated with a fixed monitoring location in a retail or other facility. For example, the radiographic imaging device 106 may be positioned at entryways, points of ingress/egress, at product storage units (shelfs, racks), loading docks, stockrooms, conveyor systems and so on. That is, the radiographic imaging device 106 may be positioned so that it can obtain x-ray images of products, for example, on a storage unit and can quickly and efficiently obtain identifications of products labeled with the radiopaque inks on the storage unit.

In some embodiments, the radiographic imaging device 106 may be incorporated in a handheld or portable device configured to be operated by medical personnel, for example, in physician's office or a hospital, as described in more detail below with reference to FIGS. 6A to 6C. The radiographic imaging device 106 can be used to quickly and non-invasively identify medical devices or other objects implanted in a patient that are labeled with the radiopaque inks described herein.

In some embodiments, the system 100 may include display device 110. The display device 110 may be configured to present the x-ray image generated by the radiographic imaging device 106. The display device 110 can be of any suitable type including, but not limited to, a cathode ray tube (CRT) device, a liquid crystal display (LCD) device, a light emitting diode (LED) device, etc. The display device 110 may also present additional information or attributes associated with the object and/or identifier in the image, such as, for example, the object's name, a model number, an expiration date, a price of the object, etc. Information about the objects may be stored in one or more databases 116, which may be configured to associate objects (and information associated therewith) with their respective identifying markings.

In some embodiments, the system 100 may include user device 112. The user input device 112 may be configured to receive input from a user, which may include, but is not limited to, device settings, user preferences, object information, etc. The user input device 112 can take any suitable form. For example, the user input device 112 may include, but is not limited to, a mouse, a touchscreen, a keyboard, a trackpad, a number pad, etc.

In some embodiments, the display device 110 and the user input device 112 may be integrated into a single component, such as a touchscreen device. In some embodiments, the display device 110 and/or the user input device 112 may be included in a computing device such as, for example, a desktop computer, a laptop computer, a tablet, a mobile device, etc. One or both of the display device 110 and the user input device 112 may also be associated with the radiographic imaging device 106 and/or an electronic device that is integrated with or communicatively coupled with the radiographic imaging device 106.

The system 100 further includes control circuit 118. The control circuit 118 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 118 is configured (for example, by using corresponding programming such as executable program code as will be well understood by those skilled in the art) to carry out one or more of the steps, actions, and/or functions described herein.

By one optional approach the control circuit 118 operably couples to a memory. The memory may be integral to the control circuit 118 or can be physically discrete (in whole or in part) from the control circuit 118 as desired. This memory can also be local with respect to the control circuit 118 (where, for example, both share a common circuit board, chassis, power supply, and/or housing) or can be partially or wholly remote with respect to the control circuit 118 (where, for example, the memory is physically located in another facility, metropolitan area, or even country as compared to the control circuit 118).

This memory can serve, for example, to non-transitorily store the computer instructions that, when executed by the control circuit 118, cause the control circuit 118 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM)).

The control circuit 118, which is communicatively coupled to the radiographic imaging device 106 via the network 103, may be configured to cause the radiographic imaging device 106 to irradiate an object 102. The control circuit 118 may receive an instruction to initiate operation of the radiographic imaging device 106. For example, in some embodiments, a user may provide an instruction via the user input device. The control circuit 118 may also receive parameter selections for operating the radiographic imaging device 106, which the control circuit 118 may then processes and execute.

The control circuit 118 may receive, from the radiographic imaging device, image data associated with the irradiated object. The control circuit may then process the image data to generate an x-ray image based on detected x-ray radiation. Since the object 102 has a radiodense identifying marking affixed to it, the x-ray image will show the identifying marking of the object. In some embodiments, the control circuit 118 may transmit the x-ray image showing the identifying marking of the object to the display device 110, which may display the image.

The control circuit may be further configured to identify the object based on the identifying marking of the object 102 shown in the x-ray image. For example, in some embodiments, the control circuit 118 may be configured to read the identifying marking 105 on the object 102 in the x-ray image and query the database 116 to obtain a match between the identifying marking 105 and the associated object 102. In some embodiments, once the control circuit determines a match between the identifying marking 105 and the associated object 102, the control circuit 118 may transmit to the display device 110 one or more attributes associated with that particular object, such as, for example, the object's name, a model number, an expiration date, a price of the object, etc. In some embodiments, the x-ray image need not be displayed at all, and instead the x-ray image and/or the x-ray image data may be processed and read by the control circuit 118 to determine an identification of the object based on its radiodense machine-readable marking.

FIG. 2 is a block diagram of an exemplary system 200 for printing a radiopaque ink composition on a substrate, according to some embodiments. The system 200 may include a printing device 214, a display device 210, a user input device 212, one or more databases 216, and a control circuit 218. While the display device 210, user input device 212, and one or more databases 216 are depicted in FIG. 2, some embodiments may not include one or more of these components, The printing device 214, the display device 210, the user input device 212, the one or more databases 216, and the control circuit 218 may be communicatively coupled via a network 203. Accordingly, the network 203 can be of any suitable type. For example, the network 203 can include a local area network (LAN) and/or wide area network (WAN), such as the internet. The network 203 can include wired and/or wireless links.

The printing device 214 is generally an ink printer or similar printing device equipped with a cartridge configured to hold ink. An exemplary commercially available ink printer that may be used in system 200 is the Dimatix Materials Printer DMP-2831. The cartridge contains a radiopaque ink composition. In some approaches, the radiopaque ink composition may be the radiopaque ink composition(s) described herein. And the printing device 214 is configured to deposit the radiopaque ink composition on a printable substrate to form on the substrate a radiodense marking. One or more printer parameters may be configured based on, for example, the particular radiopaque ink composition used and/or a concentration of metal or other radiodense compound in the ink composition. Exemplary printing parameters that may be selected based on the identification of the radiopaque ink and/or the concentration of metal or other radiodense compound in the ink composition may include at least one of waveform shape, waveform amplitude, slew rate, duration, and drop spacing. For example, in one non-limiting example, the following parameters may be used to print a barcode using the radiopaque inks described herein: square waveform amplitude: 20-30% level of ON and OFF cycles; slew rate of 1.9; duration of 4-5 µsec; and drop spacing of 2540 dpi.

The printing device 214 may be used to print radiodense markings on labels affixable to various objects. As noted above, the radiopaque ink compositions described herein are especially suitable for printing radiodense markings. In some approaches, the radiodense markings may have a Hounsfield value of at least about 20 Hounsfield Units. In some approaches, the radiodense markings may have a Hounsfield value of up to about 1,000 Hounsfield Units. In some approaches, the radiodense markings may have a Hounsfield value of from about 20 to about 200 Hounsfield Units. The radiodense markings may denote an identification of the object. For example, the radiodense markings may include machine-readable markings, such as barcodes (as shown in FIG. 1), QR codes, and the like. The radiodense markings may further include words, symbols, shapes, or any markings that may be used to identify the object. Since the markings are radiodense, they will be visible on an x-ray image or radiograph and may be detected by a radiographic imaging device (such as, for example, the radiographic imaging device described above with reference to FIG. 1), even when the markings are visually obscured, provided the material obscuring the marking is less radiodense than the markings themselves.

In some embodiments, the printing device 214 may be further equipped with a vacuum platen or other structure or feature configured to secure the substrate during printing. In some embodiments, the temperature of the vacuum platen during printing is no more than about 60° C. For example, in some approaches, the temperature of the vacuum platen during printing is may range from about 40° ° C. to about 60° C.

The substrate can be any substrate suitable for printing, including, but not limited to, paper (including glossy and matte), nitrocellulose, plastic films, textiles, vinyl, canvas, etc. In some embodiments, the substrate may be biocompatible, rendering it suitable for use on a medical implant device. In some embodiments, the substrate may be an adhesive label. The substrate generally has a maximum thickness of about 25 millimeters.

The display device 210 may be configured to display information associated with the printing device such as, for example, printing options, user selections, status identifiers, error codes, etc. The display device 210 can be of any suitable type including, but not limited to, a cathode ray tube (CRT) device, a liquid crystal display (LCD) device, a light emitting diode (LED) device, etc.

The user input device 212 may be configured to receive input from a user. The input for a user may include, but is not limited to, device settings, user preferences, object information, printing parameters, etc. The user input device 212 can take any suitable form. For example, the user input device 112 may include, but is not limited to, a mouse, a touchscreen, a keyboard, a trackpad, a number pad, etc. In some embodiments, information about the objects may be stored in one or more databases 216, which may be configured to associate objects (and information associated therewith) with their respective identifying markings and selected printer parameters.

In some embodiments, the display device 210 and the user input device 212 may be integrated into a single component, such as a touchscreen device. In some embodiments, the display device 210 and/or the user input device 212 may be included in a computing device such as, for example, a desktop computer, a laptop computer, a tablet, a mobile device, etc., which may be communicatively coupled to the printing device 214. In some approaches, the user display device 210 and/or the user input device 212 may form part of the printing device 214. Alternatively, or in addition, the user display device 210 and/or the user input device 212 may be external to the printing device 214.

The system 200 further includes the control circuit 218. The control circuit 218 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 218 is configured (for example, by using corresponding programming as will be well understood by those skilled in the art) to carry out one or more of the steps, actions, and/or functions described herein.

By one optional approach the control circuit 218 operably couples to a memory. The memory may be integral to the control circuit 118 or can be physically discrete (in whole or in part) from the control circuit 118 as desired. This memory can also be local with respect to the control circuit 118 (where, for example, both share a common circuit board, chassis, power supply, and/or housing) or can be partially or wholly remote with respect to the control circuit 118 (where, for example, the memory is physically located in another facility, metropolitan area, or even country as compared to the control circuit 118).

This memory can serve, for example, to non-transitorily store the computer instructions that, when executed by the control circuit 218, cause the control circuit 218 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM)).

In some approaches, the control circuit 218 may form part of the printing device 214. Alternatively, or in addition, the control circuit 218 may be external to the printing device 214.

In some approaches, the control circuit 218 may be configured to obtain an identification of the radiopaque ink composition in the cartridge. For example, in some embodiments, the control circuit 218 may receive the ink identification from a user via the user input device 212. In some embodiments, the control circuit 218 may be configured to recognize the particular ink in the ink cartridge and/or may the read an identification marking on the ink cartridge. As discussed above, one or more printing parameters may be selected based on the identification of the ink and/or the concentration of metal or other radiodense compound in the ink composition to obtain a viscosity suitable for printing, while maintaining sufficient radiopacity so that the radiodense markings are readable in an x-ray image. The control circuit 218 may also receive identifications of objects to which the printed substrates will be affixed. For example, in some embodiments, the control circuit 218 may receive the object identifications from a database (e.g., database 216), backend system, or the like. In some embodiments, the control circuit 218 may receive the object identifications from a user via the user input device 212. In some embodiments, the control circuit 218 may query the database 216 to identify a machine-readable marking to print that is associated with an object or object identification. The control circuit 218 may generate a machine-readable marking to print based on the object's identification.

The control circuit 218 may select one or more printing parameters including, but not limited to, waveform shape, waveform amplitude, slew rate, duration, and drop spacing, based on, for example, the identification of the radiopaque ink composition, a concentration of metal or other radiodense compound in the radiopaque ink composition, or other factors, and then may send an instruction to the ink printing device 214 to deposit the radiopaque ink composition on the substrate using one or more printing optimized parameters to form on the substrate a machine-readable code associated with the object identifier. The machine-readable codes printed on the substrate can be of any dimensions and resolution suitable to allow the code to be imaged, read, or otherwise detected by an optical reader. For example, in some embodiments, the machine-readable code may be printed on the substrate at a resolution of from about 2400 dpi to about 2600 dpi, such as, for example, 2450 dpi. In some embodiments, the machine-readable code may have a length of about 3 cm to about 10 cm and a width of about 1 cm to about 6 cm. In some non-limiting approaches, suitable barcodes may have the following dimensions: 8×4 cm, 8×3 cm, 5×2 cm, 4.5×2.5 cm, 5×2 cm, and/or 3×1 cm.

As described above, the systems, methods, and compositions described herein may be especially useful for identifying objects that may be visually obscured by other objects or material. Non-limiting examples of exemplary uses and implementations of the systems, methods, and compositions described herein are described below with reference to FIGS. 3 to 6C.

Figure 3:
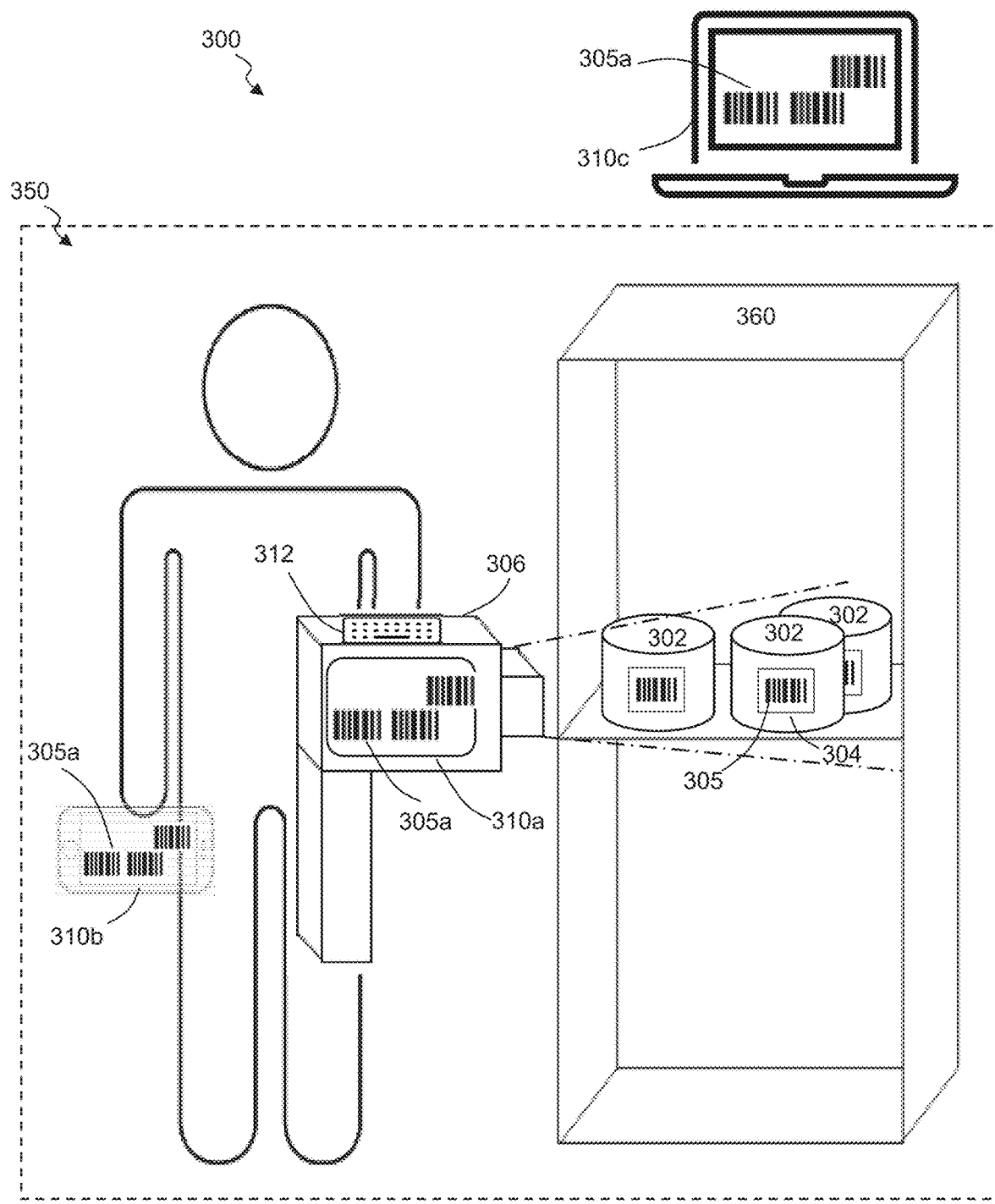
FIG. 3 is a simplified block diagram of an exemplary system for identifying consumer products in a retail facility using radiopaque ink compositions and a handheld radiographic imaging device, according to some embodiments.

For example, it can be difficult and time consuming for a store associate in a retail facility to identify a group of products arranged in multiple rows on a shelf. FIG. 3 is a simplified block diagram of an exemplary system 300 for identifying consumer products in a retail facility using radiopaque ink compositions and a handheld radiographic imaging device 306, according to some embodiments. The system 300 includes a plurality of products 302 displayed on shelving unit 360 in a retail facility 350. The products 302 have labels 304 affixed to them, the labels having printed thereon a radiodense barcode 305 printed using the radiopaque ink compositions described herein. The radiodense barcodes 305 may be printed on the labels 304 using the system 200 described above with reference to FIG. 2.

The system 300 may further include a handheld radiographic imaging device 306. The radiographic imaging device 306 may comprise the radiographic imaging device 106 described above with reference to FIG. 1. The handheld radiographic imaging device 306 may be configured to be operated by a user, such as a store associate. In some embodiments, handheld radiographic imaging device 306 may include a user input device 312 configured to receive selections by the user. The store associate directs the handheld radiographic imaging device 306 toward the products 302 on the shelf of the shelving unit 360 and operates the handheld radiographic imaging device 306 so that it emits x-ray radiation toward the products 302 in its field of view and detects the radiation reflected by the radiodense barcodes 305. In some embodiments, the handheld radiographic imaging device 306 may process the reflected radiation to generate an x-ray image 305*a*. In other embodiments, the handheld radiographic imaging device 306 may transmit the image data to a central processor (not shown), which processes the image data to generate an x-ray image 305*a*.

The x-ray image 305*a* may be displayed, for example, on a display device associated with a handheld radiographic imaging device 306 (see 310*a*), on a display device associated with the store associate's mobile device (see 310*b*), and/or on a display device remote from the retail facility 350 (see 310*c*). The x-ray image may display all of the barcodes that are in the handheld radiographic imaging device's field of view, even those located behind other products 302, provided there are no materials or objects in front of the products that have a radiodensity higher than the barcodes, thereby allowing a store associate to quickly and efficiently obtain information about multiple rows of products on a shelf.

The handheld radiographic imaging device 306 may be further configured to read the barcodes in the x-ray image 305*a* and determine an identity of the products 302 by querying a database. In other embodiments, this function may be performed external to the handheld radiographic imaging device 306, such as by a central processor. The product identifications can then be used, for example, to update an inventory database, make restocking determinations, etc. In some embodiments, the x-ray image need not be displayed at all, and instead the x-ray image and/or the x-ray image data may be processed and read by a processor to determine an identification of the products based on their radiodense barcodes.

Figure 4:
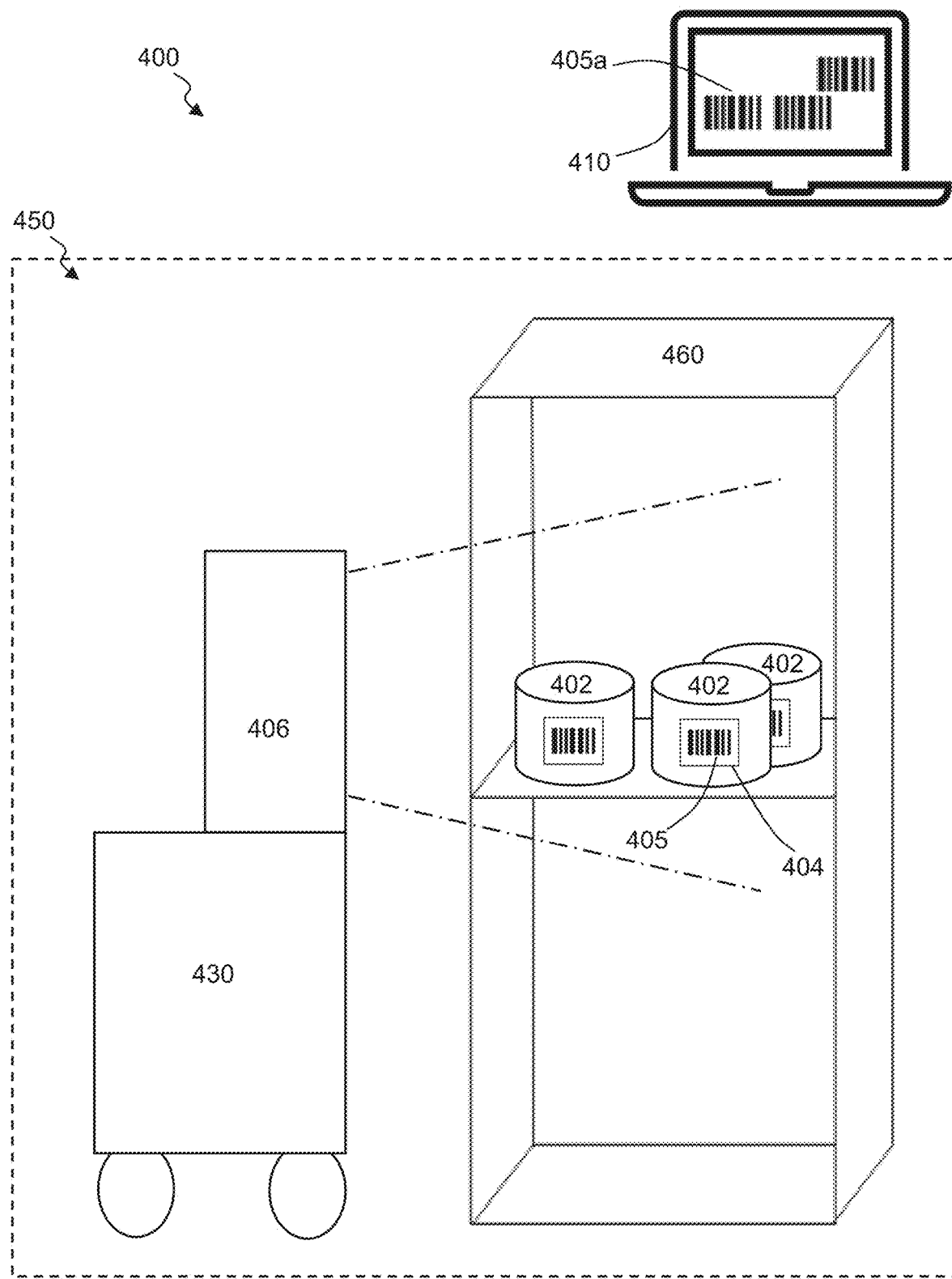
FIG. 4 is a simplified block diagram of an exemplary system for identifying consumer products in a retail facility using radiopaque ink compositions and a radiographic imaging device associated with an autonomous robot, according to some embodiments.

FIG. 4 is a simplified block diagram of an exemplary system 400 for identifying consumer products in a retail facility using radiopaque ink compositions and a radiographic imaging device 406 associated with an autonomous robot 430, according to some embodiments. The system 400 includes a plurality of products 402 displayed on shelving unit 460 in a retail facility 450. The products 402 have labels 404 affixed to them, the labels having printed thereon a radiodense barcode 405 printed using the radiopaque ink compositions described herein. The barcodes 405 may be printed on the labels 404 using the system 200 described above with reference to FIG. 2.

In system 400, the radiographic imaging device 406 is associated with an autonomous robot 430. The autonomous robot 430 is configured to autonomously travel about the retail facility 450 collecting information relating to, for example, products for sale, inventory, cleanliness, etc. In doing so, the radiographic imaging device 406 associated with the robot may be configured to capture x-ray image data of products 402 displayed on shelf of the shelving unit 460. In some embodiments, the x-ray image data may be processed by the radiographic imaging device 406 to generate an x-ray image 405a. In other embodiments, the radiographic imaging device 406 may transmit the image data to a central processor (not shown), which processes the image data to generate an x-ray image 405a.

The x-ray image 405a may be displayed, for example, on a display device 410, which may be separate from the autonomous robot 430 or vehicle, the radiographic imaging device 406, and/or the retail facility 450. The x-ray image may display all of the barcodes that are in the radiographic imaging device's field of view, even those located behind other products 402, provided there are no materials or objects in front of the products that have a radiodensity higher than the barcodes, thereby allowing the robot to quickly and efficiently obtain information about multiple rows of products on a shelf autonomously.

In some embodiments, autonomous robot 430 and/or the radiographic imaging device 406 may be further configured to read the barcodes in the x-ray image 405a and determine an identity of the products 402 by querying a database. In other embodiments, this function may be performed external to the autonomous robot 430 and/or the radiographic imaging device 406, such as by a central processor. The product identifications can then be used, for example, to update an inventory database, make restocking determinations, etc. In some embodiments, the x-ray image need not be displayed at all, and instead the x-ray image and/or the x-ray image data may be processed and read by a processor to determine an identification of the products based on their radiodense barcodes and use those product identifications make assessments about product inventory.

Figure 5A:
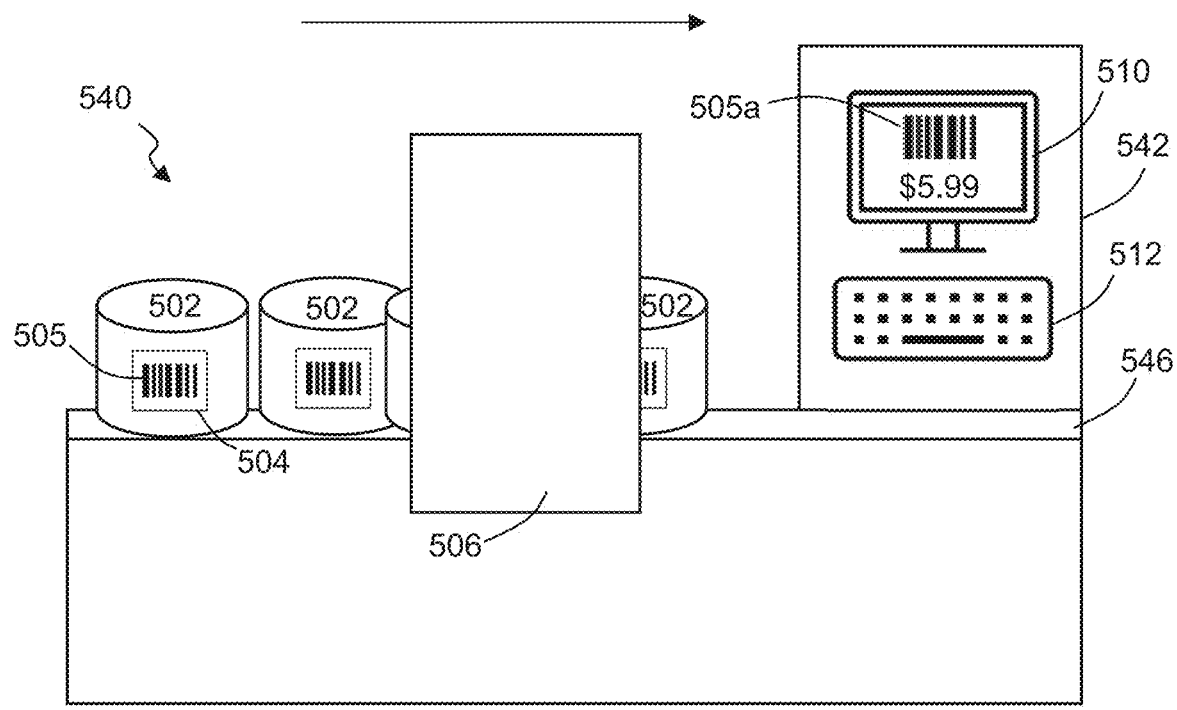
FIGS. 5A and 5B illustrate simplified block diagrams of an exemplary system for identifying products in a retail facility using radiopaque ink compositions with a radiographic imaging device associated with a point-of-sale terminal, according to some embodiments.
Figure 5B:
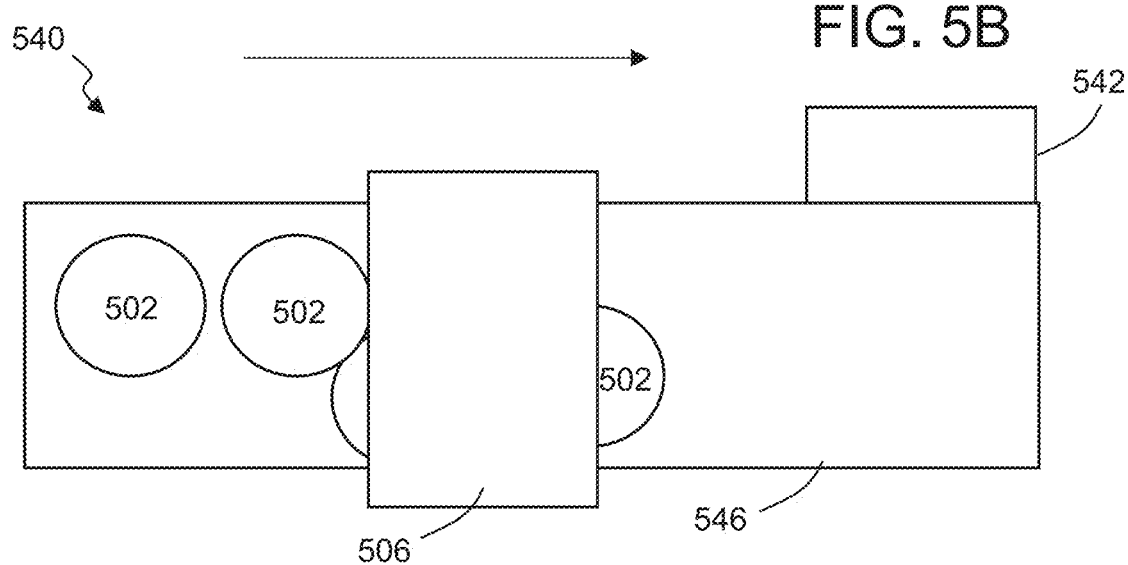

FIGS. 5A and 5B illustrate simplified block diagrams of an exemplary system for identifying products in a retail facility using radiopaque ink compositions with a radiographic imaging device 506 associated with a point-of-sale terminal 540, according to some embodiments. 5A shows a side view of the point-of-sale terminal 540 and FIG. 5B shows a top view of the point-of-sale terminal 540.

The system includes a plurality of products 502 displayed on conveyor 546 associated with the point-of-sale terminal 540 in a retail facility. The products 502 have labels 504 affixed to them, the labels having printed thereon a radiodense barcode 505 printed using the radiopaque ink compositions described herein. The barcodes 505 may be printed on the labels 504 using the system 200 described above with reference to FIG. 2.

The point-of-sale terminal 540 may comprise, for example, a self-service kiosk used by customers to purchase or return merchandise, or the point-of-sale terminal 540 may be staffed by a store associate. The point-of-sale terminal 540 may be equipped with a display device 510 and a user input device 512, which may form part of a user terminal 542. The display device 510 and the user input device 512 may comprise the display device 110 and the user input device 112 described above with reference to FIG. 1.

The radiographic imaging device 506 may comprise the radiographic imaging device 106 described above with reference to FIG. 1. The radiographic imaging device 506 may be positioned about the conveyor 546 so that it can obtain x-ray images of the products 502 traveling on the conveyor 546. For example, the radiographic imaging device 506 may form a tunnel through which the products 502 are conveyed by the conveyor 546. In some embodiments, the conveyor 546, the radiographic imaging device 506, and/or the point-of-sale terminal 540 may be equipped with one or more sensors configured to detect the presence of the products entering the tunnel and prompt the radiographic imaging device 506 to scan the products in the tunnel. In operation, the radiographic imaging device 506 emits x-ray radiation toward the products 502 in the tunnel and detects the radiation reflected by the radiodense barcodes 505. In some embodiments, the radiographic imaging device 506 may process the reflected radiation to generate an x-ray image 505a. In other embodiments, the radiographic imaging device 506 may transmit the image data to a central processor (not shown), which processes the image data to generate an x-ray image 505a.

The x-ray image 505a may be displayed, for example, on the display device 510 associated point-of-sale terminal 540. The x-ray image may display the barcodes that are in the radiographic imaging device's field of view, even those located behind other products, provided there are no materials or objects in front of the products that have a radiodensity higher than the barcodes.

The radiographic imaging device 506 may be further configured to read the barcodes and determine an identity (and, in some embodiments, a price) of the products 502 by querying a database. In other embodiments, this function may be performed external to the radiographic imaging device and/or the point of-sale terminal, such as by a central processor, a backend system, or the like. In some embodiments, the x-ray image need not be displayed at all, and instead the x-ray image and/or the x-ray image data may be processed and read by a processor to determine the identity and price of the products.

FIGS. 6A, 6B, and 6C illustrate a simplified block diagram of an exemplary system for identifying a medical implant 602 in a patient 650 using radiopaque ink compositions with a handheld radiographic imaging device, according to some embodiments. The handheld radiographic imaging device may be operated by medical personnel, for example, in physician's office or hospital.

As shown in FIG. 6A, the medical implant 602 has a label 604 affixed thereto and printed on the label 604 is a radiodense barcode 605. The radiodense barcode 605 may be printed using the radiopaque ink compositions described herein. The barcode 605 may be printed on the label 504 using the system 200 described above with reference to FIG. 2. The label 604 is formed of a biocompatible material safe for use in humans.

FIG. 6B illustrates a patient 650. The patient 650 has a medical implant 602 (generically referred to as a medical device) implanted in their leg 650a, the medical implant 602 having the label 604 with the radiodense barcode 605 disposed thereon. The medical implant 602 implanted in the patient's leg 650a is shown in broken lines in FIG. 6B.

In FIG. 6C, a handheld radiographic imaging device 606 is being used (e.g., by a physician, nurse, assistant, etc.) to image the patient's leg 650a. In some embodiments, the handheld radiographic imaging device 606 may include a user input device 612 configured to receive selections by the user. The user (not shown) directs the handheld radiographic imaging device 606 toward the patient's leg 650a and operates the handheld radiographic imaging device 606 so that it emits x-ray radiation toward the patent's leg where the implant is expected to be and detects the radiation reflected by the radiodense barcode 605 disposed on the implant. In some embodiments, the handheld radiographic imaging device 606 may process the reflected radiation to generate an x-ray image 605a. In other embodiments, the handheld radiographic imaging device 606 may transmit the image data to a central processor (not shown), which processes the image data to generate an x-ray image 605a.

The x-ray image 605a may be displayed, for example, on a display device associated with a handheld radiographic imaging device 606 (see 610a) and/or on a display device separate from the radiographic imaging device, for example via an electronic computing device (see 610b).

The handheld radiographic imaging device 606 and/or the electronic computing device 610b may be further configured to read the barcode in the x-ray image 605a and determine an identity of the medical implant 602 by querying a database. In other embodiments, this function may be performed external to the radiographic imaging device 606 and/or the electronic computing device 610b, such as by a central processor. In some embodiments, the x-ray image need not be displayed at all, and instead the x-ray image and/or the x-ray image data may be processed and read by a processor to determine an identification of the medical implant based on its radiodense barcode. The systems, methods, and compositions described herein allow a user to quickly and non-invasively identify an object or device that has been implanted in a patient.

FIG. 7 depicts a simplified flow diagram of an exemplary process 700 of identifying an object, in accordance with some embodiments. The process 700 may be implemented using the radiopaque ink composition(s) described herein and one or more of the systems described herein with reference to FIGS. 1 to 6C and/or one or more components thereof. The flow begins at block 702.

At block 702, a radiographic imaging device irradiates an object with x-ray radiation and detects reflected x-ray radiation. For example, a control circuit may execute instructions to cause the radiographic imaging device to irradiate the object with x-ray radiation and detect the reflected x-ray radiation. The radiographic imaging device may be a backscatter x-ray imaging device configured to emit and detect x-rays. The x-rays may have an incident intensity suitable for the particular use/application A radiographic imaging device that emits lower levels of radiation is particularly suitable for use with a handheld or portable imaging device or for use in public spaces. In some approaches, the control circuit and radiographic imaging device may be the control circuit 118 and radiographic imaging device 106 described above with reference to FIG. 1. The object has disposed thereon a radiodense identifying marking formed of a radiopaque ink composition. The radiopaque ink may be printed on any substrate suitable for printing including, but not limited to, paper (including glossy and matte), nitrocellulose, plastic films, textiles, vinyl, canvas, etc. In some embodiments, the substrate may be biocompatible, rendering it suitable for use with medical implant devices in humans. In some approaches, the radiodense markings may be printed on the objects themselves. In other approaches, the radiodense markings may be printed on outer packaging associated with the objects. The radiodense markings can also be printed on adhesive labels, which may then be affixed to the objects and/or the objects' packaging.

At block 704, the control circuit receives, from the radiographic imaging device, image data associated with the object. For example, the control circuit may receive the image data from the radiographic imaging device over a network. The network can be of any suitable type. For example, the network can include a local area network (LAN) and/or wide area network (WAN), such as the internet. The network can include wired and/or wireless links.

At block 706, the control circuit processes the image data to produce an x-ray image that shows the identifying marking of the object. For example, the control circuit may execute a series of computer readable instructions to generate the x-ray image from the image data.

At block 708, the control circuit causes a display device to display the x-ray image showing the identifying marking of the object. The display device may be configured to present the x-ray image generated by the radiographic imaging device. The display device can be of any suitable type including, but not limited to, a cathode ray tube (CRT) device, a liquid crystal display (LCD) device, a light emitting diode (LED) device, etc. The display device may also present additional information or attributes associated with the object and/or identifier in the image, such as, for example, the object's name, a model number, an expiration date, a price of the object, etc. Information about the objects may be stored in one or more databases, which may be configured to associate objects (and information associated therewith) with their respective identifying markings. In some embodiments, the display device and the one or more databases may be the those which are described above with reference to FIG. 1

At block 710, the control circuit identifies the object based on the identifying marking of the object shown in the x-ray image. For example, the control circuit may read the identifying marking on the object in the x-ray image and query the database to obtain a match between the identifying marking and the associated object. Once the control circuit determines a match between the identifying marking and the associated object, the control circuit may transmit to the display device one or more attributes associated with that particular object, such as, for example, the object's name, a model number, an expiration date, a price of the object, etc.

FIG. 8 depicts a simplified flow diagram of an exemplary process 800 of printing a radiopaque ink composition on a substrate, in accordance with some embodiments. The process 800 may be implemented using the radiopaque ink composition(s) described herein and one or more of the systems described herein with reference to FIGS. 1 to 6C and/or one or more components thereof. The flow begins at block 802.

At block 802, an ink printing device is provided. The ink printing device may comprise a cartridge containing the radiopaque ink compositions described herein (e.g., an inkjet printer having a piezo inkjet cartridge). In some embodiments, the radiopaque ink composition generally may have a maximum viscosity of about 12 centipoise, rendering it suitable for use with an ink printer or similar printing device. In some embodiments, the ink printing device may be equipped with a vacuum platen configured to secure a printable substrate. In some embodiments, the temperature of the vacuum platen during printing may range from about 40° C. to about 60° C.

Any substrate suitable for printing a radiopaque ink is contemplated including, but not limited to, paper (including glossy and matte), nitrocellulose, plastic films, textiles, vinyl, canvas, etc. In some embodiments, the substrate may be biocompatible, rendering it suitable for use with medical implant devices in humans. In some approaches, the substrate may have a maximum thickness of about 25 millimeters. The radiopaque ink when printed may form a radiodense marking that identifies an object and can be imaged by a radiographic imaging device (and, in some embodiments, an optical reader). For example, the radiodense marking may include machine-readable markings, such as barcodes (as shown in FIG. 1), QR codes, and the like. The radiodense markings may further include words, symbols, shapes, or any markings that may be used to identify the object. Since the markings are radiodense, they will be visible on an x-ray image or radiograph, and may be detected by a radiographic imaging device (such as, for example, the radiographic imaging device described above with reference to FIG. 1), even when the markings are visually obscured, provided the material obscuring the marking is less radiodense than the markings themselves.

In some approaches, the radiodense marking may be printed on the objects themselves. In other approaches, the radiodense marking may be printed on outer packaging associated with the objects. The radiodense marking can also be printed on adhesive labels, which may then be affixed to the objects and/or the objects' packaging.

The ink printing device may be communicatively coupled to a control circuit. In some embodiments the ink printing device and the control circuit may comprise the printing device 214 and the control circuit 218 described above with reference to FIG. 2. In some approaches, the control circuit may form part of the printing device. Alternatively, or in addition, the control circuit may be external to the printing device.

At block 804, an identification of the radiopaque ink composition in the cartridge is obtained. For example, in some embodiments, the control circuit may receive the ink identification from a user via a user input device. The user input device may comprise the user input device 212 described above with reference to FIG. 2. In some embodiments, the control circuit may be configured to recognize the particular ink in the ink cartridge and/or may the read an identification marking on the ink cartridge.

At block 806, the control circuit receives an identifier of an object to which the printed substrate will be affixed. For example, in some embodiments, the control circuit may receive the object identification from a database, a backend system, or the like. In some embodiments, the control circuit may receive the object identifications from a user via a user input device. In some embodiments, the control circuit may then query one or more databases to identify a machine-readable marking to print that is associated with the object or object identifier. In some embodiments, the control circuit may generate a machine-readable marking to print based on the object's identification.

At block 808, one or more printing parameters are selected based on the identification of the radiopaque ink composition. For example, the control circuit may select one or more printing parameters such as, but not limited to, waveform shape, waveform amplitude, slew rate, duration, and drop spacing, based at least on the identification of the radiopaque ink composition and/or a concentration of metal or other radiodense compound in the radiopaque ink composition.

At block 810, the control circuit causes the ink printing device to deposit the radiopaque ink composition on the substrate using the one or more printing parameters to form on the substrate a radiodense machine-readable code associated with the object identifier. For example, the control circuit may send an instruction to the ink printing device to print a particular machine-readable code based on input from the user, the object identifier, etc. In some approaches, the printed radiodense markings may have a Hounsfield value of at least about 20 Hounsfield Units. In some approaches, the radiodense markings may have a Hounsfield value of up to about 1,000 Hounsfield Units. In some approaches, the radiodense markings may have a Hounsfield value of from about 20 to about 200 Hounsfield Units.

The machine-readable codes printed on the substrate can be of any dimensions and resolution suitable to allow the code to be imaged, read, or otherwise detected by an optical reader. For example, in some embodiments, the machine-readable code may be printed on the substrate at a resolution of from about 2400 dpi to about 2600 dpi, in some approaches at a resolution of 2450 dpi. In some embodiments, the machine-readable code may have a length of about 3 cm to about 10 cm and a width of about 1 cm to about 6 cm. In some non-limiting approaches, suitable barcodes may have the following dimensions: 8×4 cm, 8×3 cm, 5×2 cm, 4.5×2.5 cm, 5×2 cm, and/or 3×1 cm.

Figure 9:
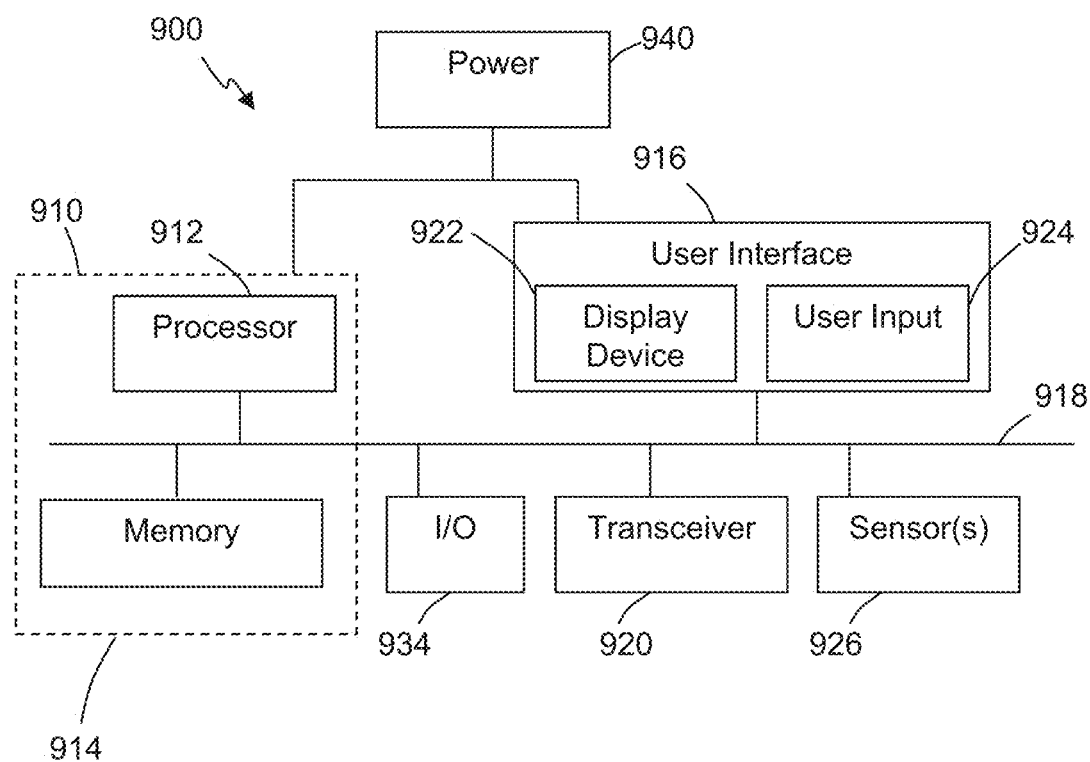
FIG. 9 is a block diagram of an exemplary system for use in implementing methods, techniques, components, circuits, circuitry, functionality, systems, apparatuses, and devices for printing radiopaque inks on a substrate, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 9 illustrates an exemplary system 900 that may be used for implementing any of the components, circuits, circuitry, systems, functionality, apparatuses, processes, or devices of system 100, system 200, system 300, system 400, system of FIGS. 5A-5B, and system of FIGS. 6A-6C, components thereof, and/or other above or below mentioned systems or devices, or parts of such circuits, circuitry, functionality, systems, apparatuses, processes, or devices. However, the use of the system 900 or any portion thereof is certainly not required.

By way of example, the system 900 may comprise a control circuit 912 or processor module, memory 914, and one or more communication links 918, paths, buses or the like. Some embodiments may include one or more user interfaces 916, and/or one or more internal and/or external power sources or supplies 940. The control circuit 912 (which may form all or part of control circuit 118 and/or 218) can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 912 can be part of control circuitry and/or a control system 910, which may be implemented through one or more processors with access to one or more memory 914 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 900 may be used to implement one or more of the above or below, or parts of, components, circuits, systems, processes and the like.

The user interface 916 can allow a user to interact with the system 900 and receive information through the system. In some instances, the user interface 916 includes a display 922 and/or one or more user inputs 924, such as buttons, touch screen, track ball, keyboard, mouse, etc., which can be part of or wired or wirelessly coupled with the system 900. Typically, the system 900 further includes one or more communication interfaces, ports, transceivers 920 and the like allowing the system 900 to communicate over a communication bus, a distributed computer and/or communication network 103 (e.g., a local area network (LAN), the Internet, wide area network (WAN), etc.), communication link 918, other networks or communication channels with other devices and/or other such communications or combination of two or more of such communication methods. Further the transceiver 920 can be configured for wired, wireless, optical, fiber optical cable, satellite, or other such communication configurations or combinations of two or more of such communications. Some embodiments include one or more input/output (I/O) ports 934 that allow one or more devices to couple with the system 900. The I/O ports can be substantially any relevant port or combinations of ports, such as but not limited to USB, Ethernet, or other such ports. The I/O ports 934 can be configured to allow wired and/or wireless communication coupling to external components. For example, the I/O ports can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 926 to provide information to the system and/or sensor information that is communicated to another component, such as one or more control circuits, databases, radiographic imaging devices, display devices, user input devices, printing devices, etc. The sensors can include substantially any relevant sensor, such as distance measurement sensors (e.g., optical units, sound/ultrasound units, etc.), optical based scanning sensors to sense and read optical patterns (e.g., bar codes), and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 900 comprises an example of a control and/or processor-based system with the control circuit 912. Again, the control circuit 912 can be implemented through one or more processors, controllers, central processing units, logic, software and the like. Further, in some implementations the control circuit 912 may provide multiprocessor functionality.

The memory 914, which can be accessed by the control circuit 912, typically includes one or more processor readable and/or computer readable media accessed by at least the control circuit 912, and can include volatile and/or nonvolatile media, such as RAM, ROM, EEPROM, flash memory and/or other memory technology. Further, the memory 914 is shown as internal to the control system 910; however, the memory 914 can be internal, external or a combination of internal and external memory. Similarly, some or all of the memory 914 can be internal, external or a combination of internal and external memory of the control circuit 912. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 103. The memory 914 can store code, software, executables, scripts, data, content, lists, programming, programs, log or history data, user information, customer information, product information, and the like. While FIG. 9 illustrates the various components being coupled together via a bus, it is understood that the various components may actually be coupled to the control circuit and/or one or more other components directly.

Figure 10:
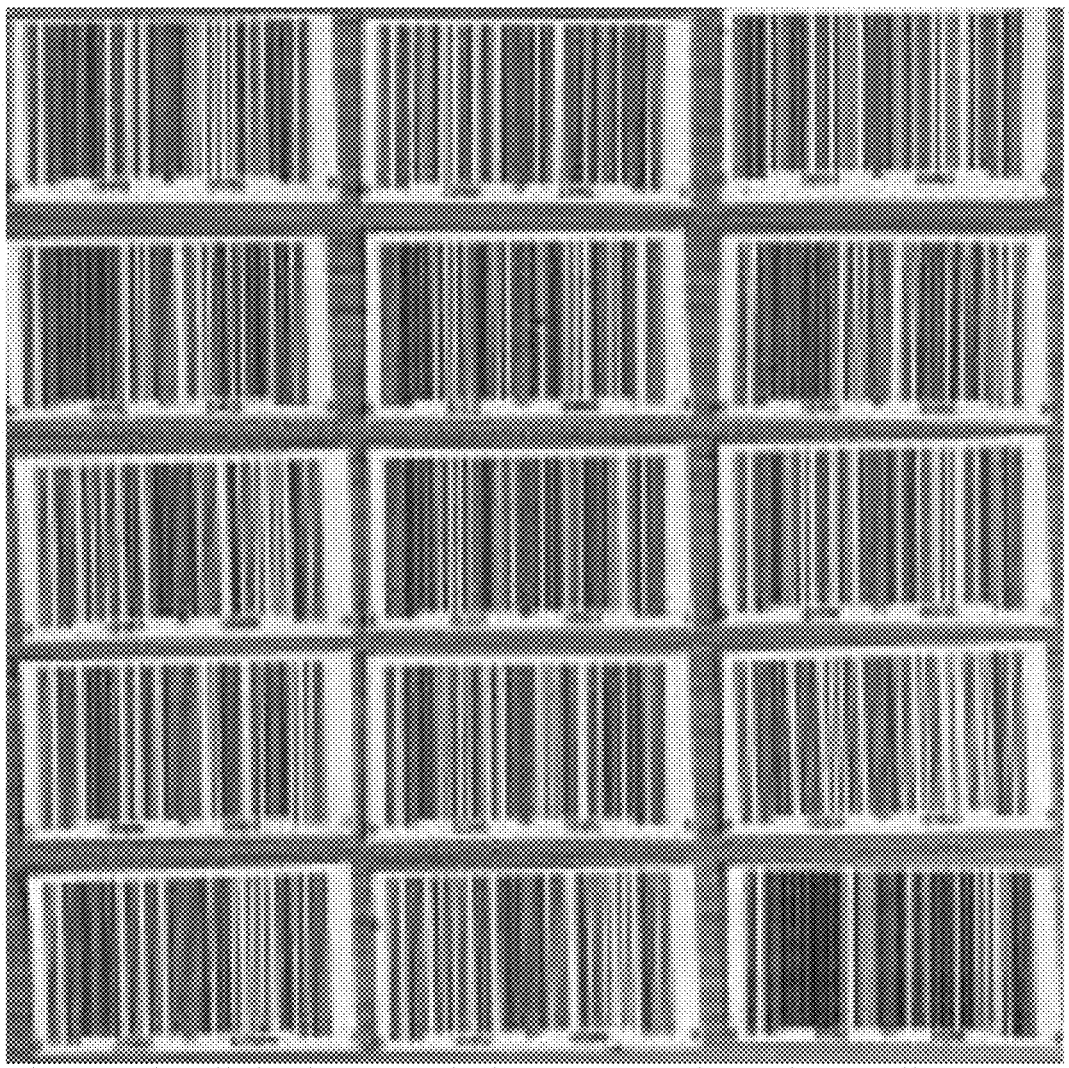
FIG. 10 is an exemplary image of a group of barcodes printed by a Dimatix Materials Printer DMP-2831 using a radiopaque silver nanoparticle ink composition on an A4 sheet substrate, in accordance with some embodiments.

FIGS. 10 to 18B illustrate various sizes of exemplary barcodes printed on various exemplary substrates in accordance with some embodiments. FIGS. 10 through 18B are photographic images used rather than black and white line drawings to convey certain visual information not easily represented in traditional line drawings. The barcodes were printed using the following parameters:
Drop spacing for all inks: 2540 dpi
Print cartridge height: 1.000 mm
Platen temperature: 40 to 60 C
Cartridge temperature: 35 C
Meniscus setpoint: 3.5
Jetting voltage (All): 22 V
Cleaning cycle: Start of orienting: Purge 0.5 seconds blot, During printing: Purge 0.3 seconds blot FIG. 10 is an exemplary image of a group of barcodes printed by a Dimatix Materials Printer DMP-2831 using a radiopaque silver nanoparticle ink composition on an A4 sheet substrate. The barcode size is 8 cm by 4 cm and the barcodes were printed at a resolution of 2540 dpi.

Figure 11:
FIG. 11 is an exemplary image of a group of barcodes printed by a Dimatix Materials Printer DMP-2831 using a radiopaque silver nanoparticle ink composition on an A4 sheet substrate, in accordance with some embodiments.

FIG. 11 is an exemplary image of a group of barcodes printed by a Dimatix Materials Printer DMP-2831 using a radiopaque silver nanoparticle ink composition on an A4 sheet substrate. The barcode size is 5 cm by 2.5 cm and the barcodes were printed at a resolution of 2540 dpi.

Figure 12:
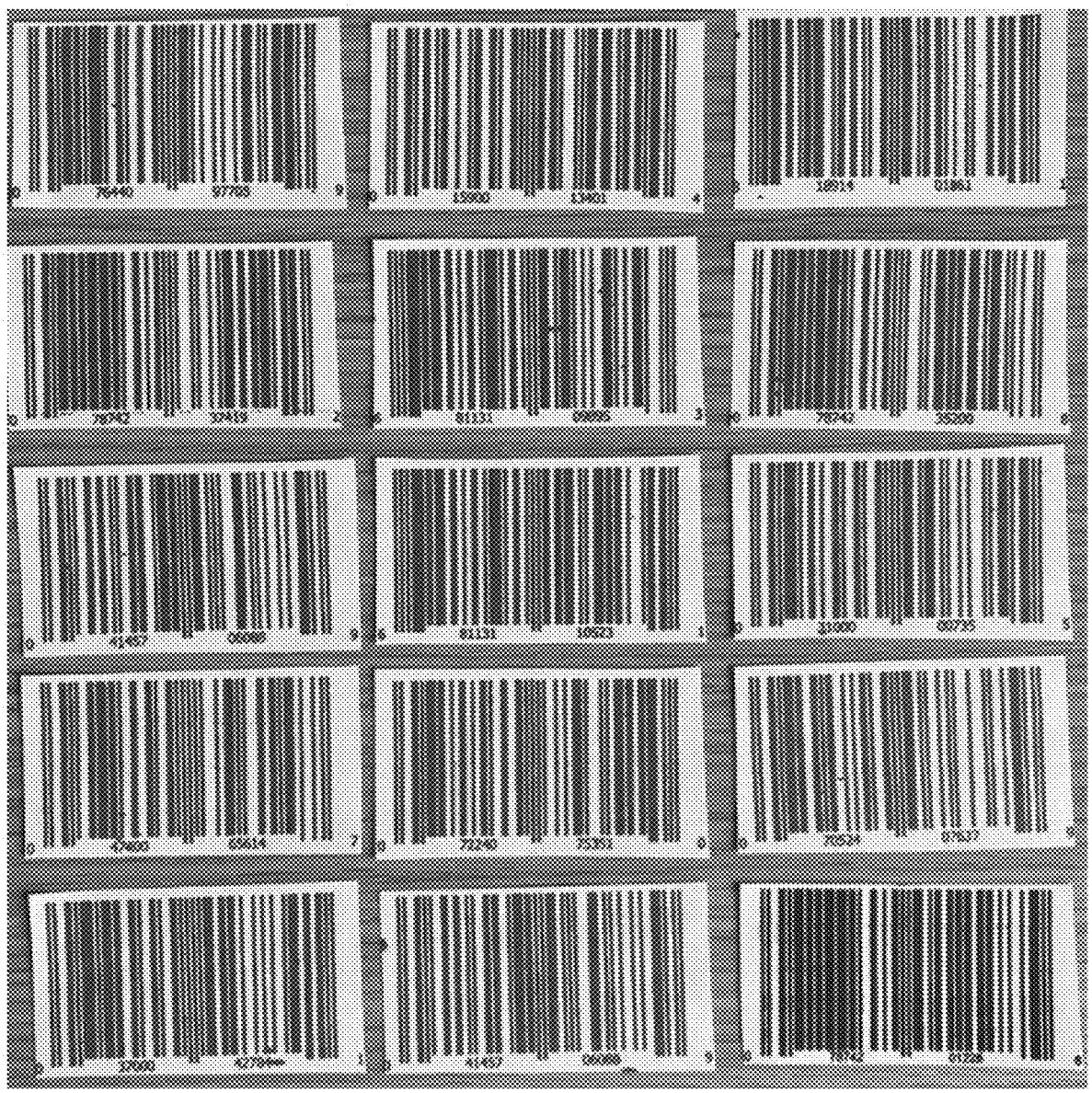
FIG. 12 is an exemplary image of a group of barcodes printed by a Dimatix Materials Printer DMP-2831 using a radiopaque silver nanoparticle ink composition on an A4 sheet substrate, in accordance with some embodiments.

FIG. 12 is an exemplary image of a group of barcodes printed by a Dimatix Materials Printer DMP-2831 using a radiopaque silver nanoparticle ink composition on an A4 sheet substrate. The barcode size is 8 cm by 4 cm and the barcodes were printed at a resolution of 2540 dpi.

Figure 13:
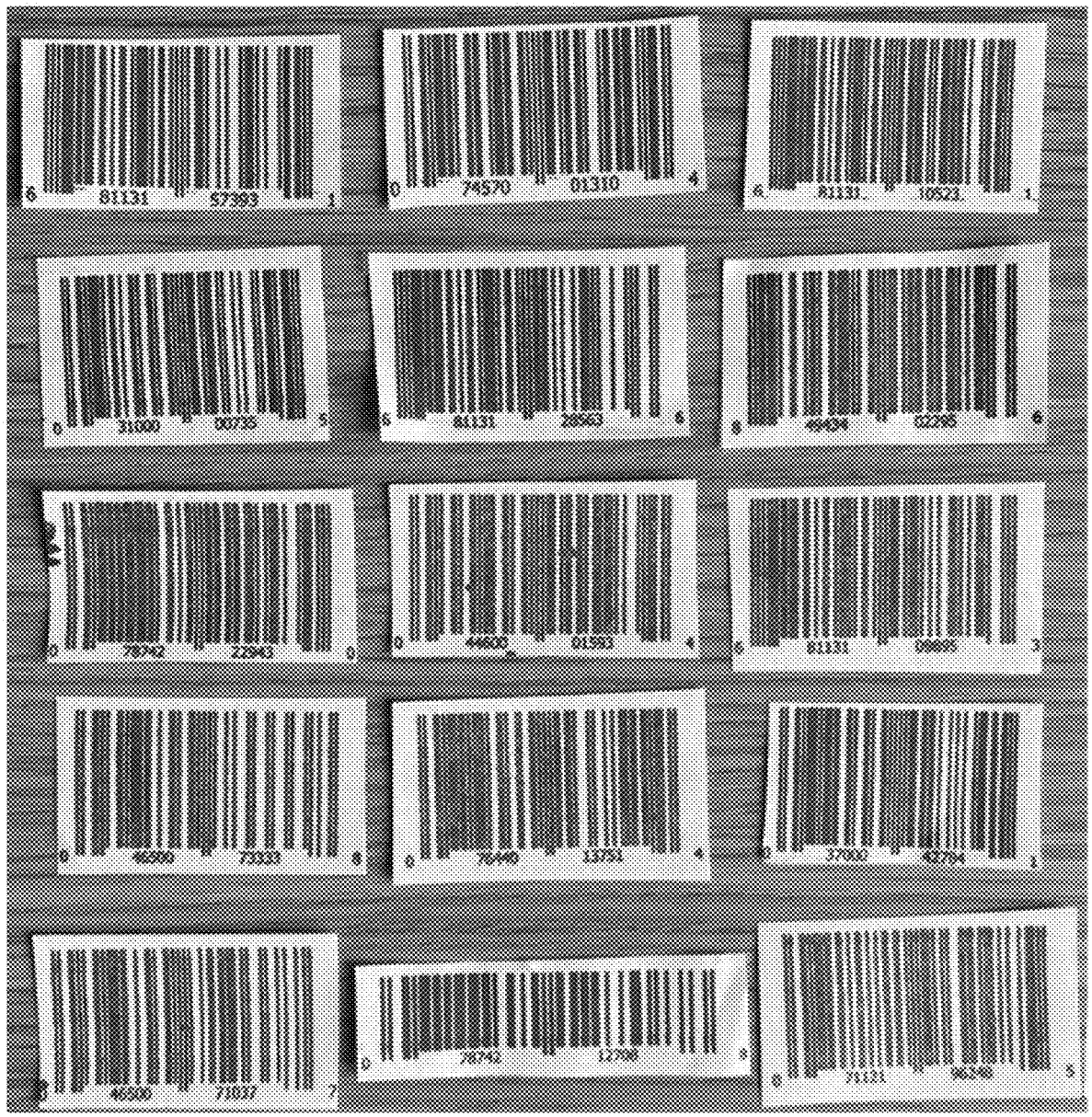
FIG. 13 is an exemplary image of a group of barcodes printed by a Dimatix Materials Printer DMP-2831 using a radiopaque silver nanoparticle ink composition on an A4 sheet substrate, in accordance with some embodiments.

FIG. 13 is an exemplary image of a group of barcodes printed by a Dimatix Materials Printer DMP-2831 using a radiopaque silver nanoparticle ink composition on an A4 sheet substrate. The barcode size is 5 cm by 2.5 cm and the barcodes were printed at a resolution of 2540 dpi.

Figure 14:
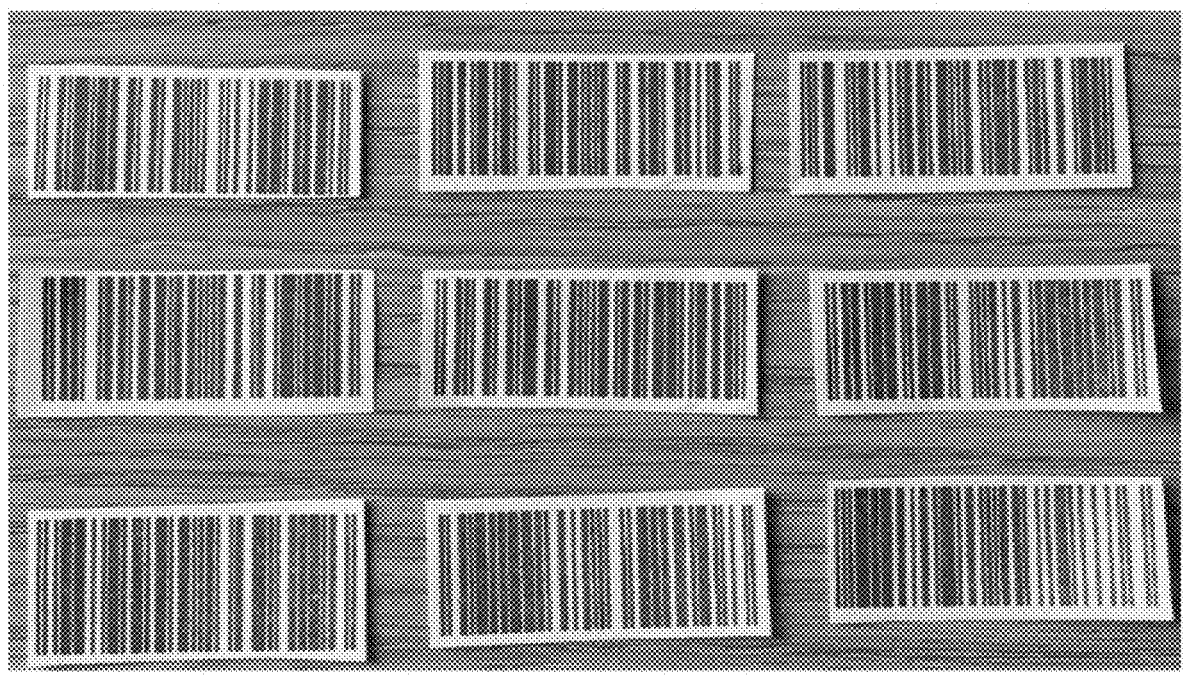
FIG. 14 is an exemplary image of a group of barcodes printed by a Dimatix Materials Printer DMP-2831 using a radiopaque silver nanoparticle ink composition on an A4 sheet substrate, in accordance with some embodiments.

FIG. 14 is an exemplary image of a group of barcodes printed by a Dimatix Materials Printer DMP-2831 using a radiopaque silver nanoparticle ink composition on an A4 sheet substrate. The barcode size is 5 cm by 2 cm and the barcodes were printed at a resolution of 2540 dpi.

Figure 15:
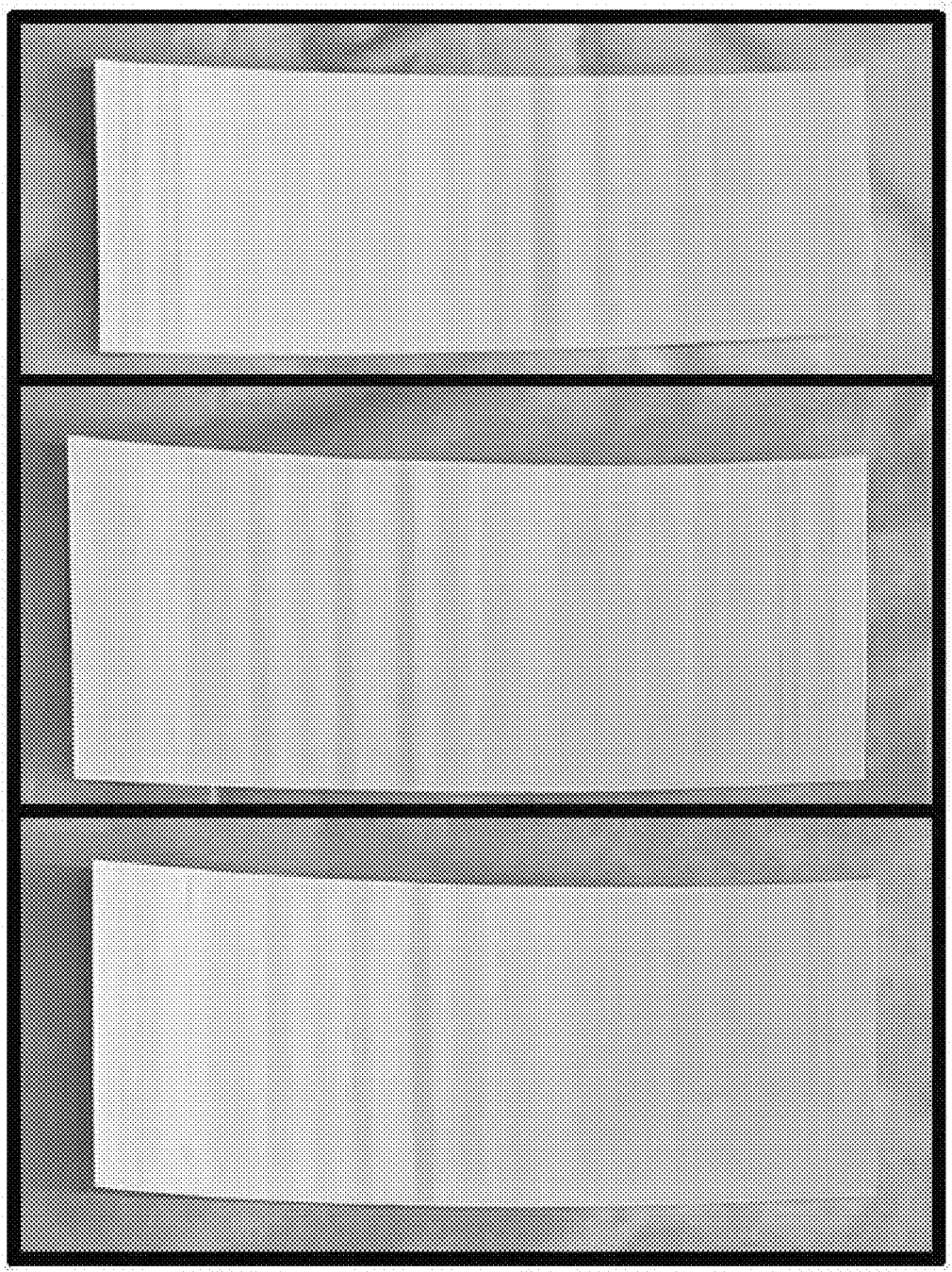
FIG. 15 is an exemplary image of a group of barcodes printed by a Dimatix Materials Printer DMP-2831 using bismuth neodecanoate and/or triphenyl bismuth and/or europium trufluoromethanesulfonate inks on nitrocellulose sheets, in accordance with some embodiments.

FIG. 15 is an exemplary image of a group of barcodes printed by a Dimatix Materials Printer DMP-2831 using bismuth neodecanoate and/or triphenyl bismuth and/or europium trufluoromethanesulfonate inks on nitrocellulose sheets.

Figure 16:
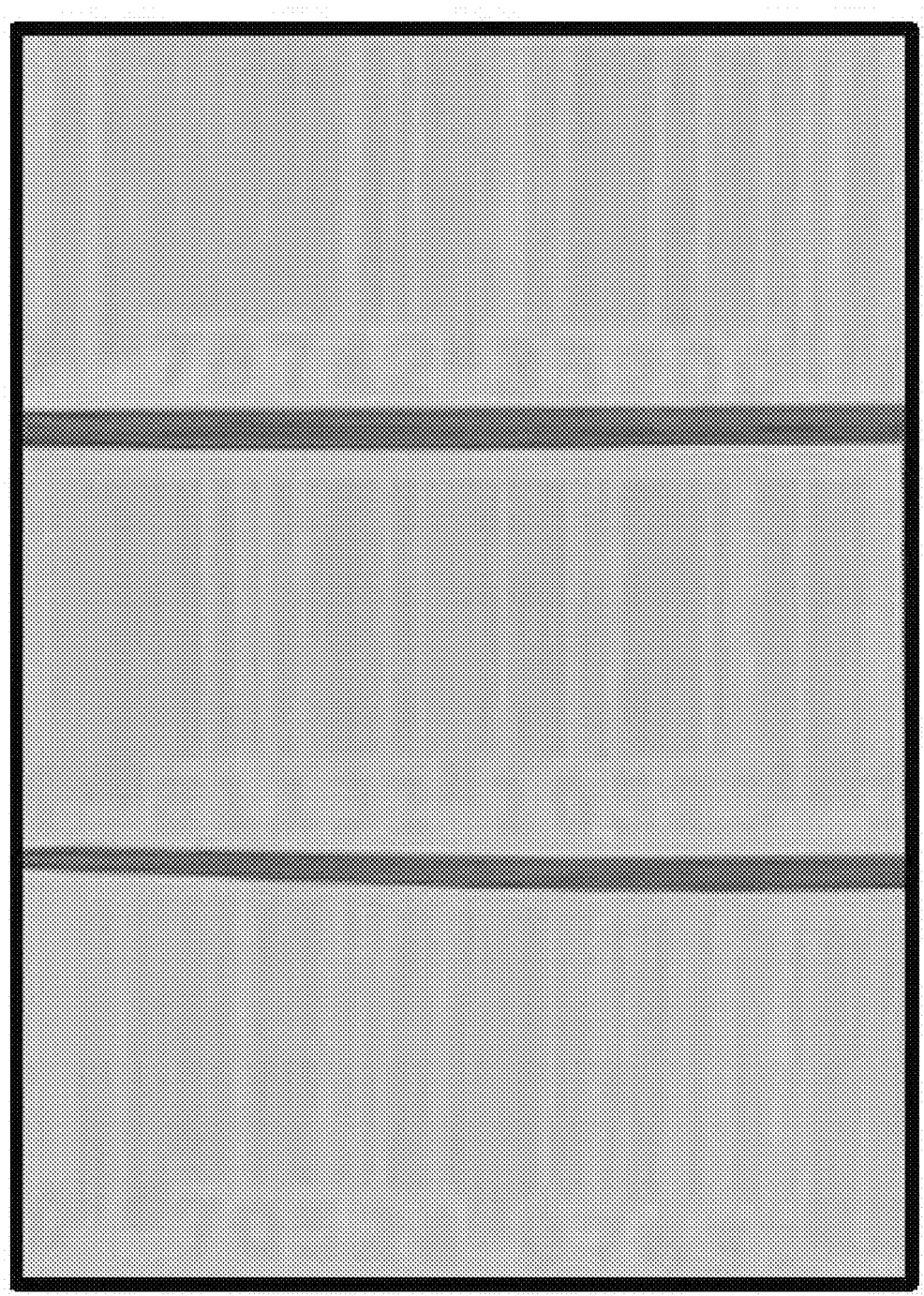
FIG. 16 is an exemplary image of a group of barcodes printed by a Dimatix Materials Printer DMP-2831 using bismuth neodecanoate and/or triphenyl bismuth inks on calligraphy sheets, in accordance with some embodiments.

FIG. 16 is an exemplary image of a group of barcodes printed by a Dimatix Materials Printer DMP-2831 using bismuth neodecanoate and/or triphenyl bismuth inks on calligraphy sheets.

Figure 17A:
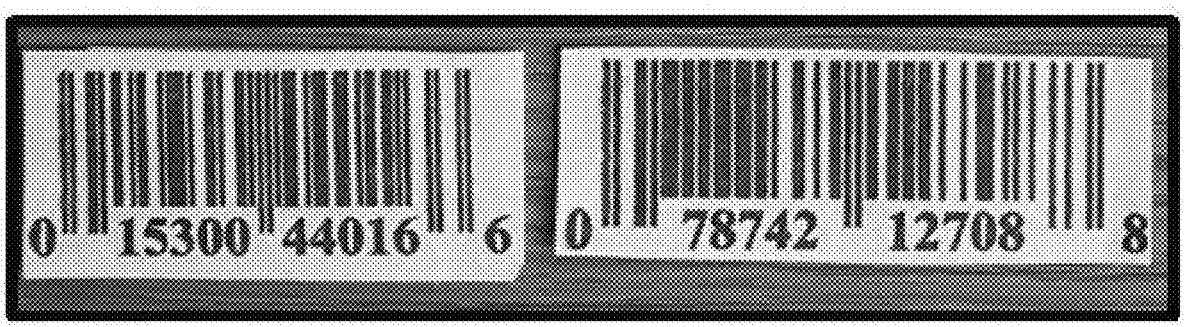
FIG. 17A is an exemplary image of a group of barcodes printed by a Dimatix Materials Printer DMP-2831 using silver ink on A4 paper, in accordance with some embodiments.

FIG. 17A is an exemplary image of a group of barcodes printed by a Dimatix Materials Printer DMP-2831 using silver ink on A4 paper.

Figure 17B:
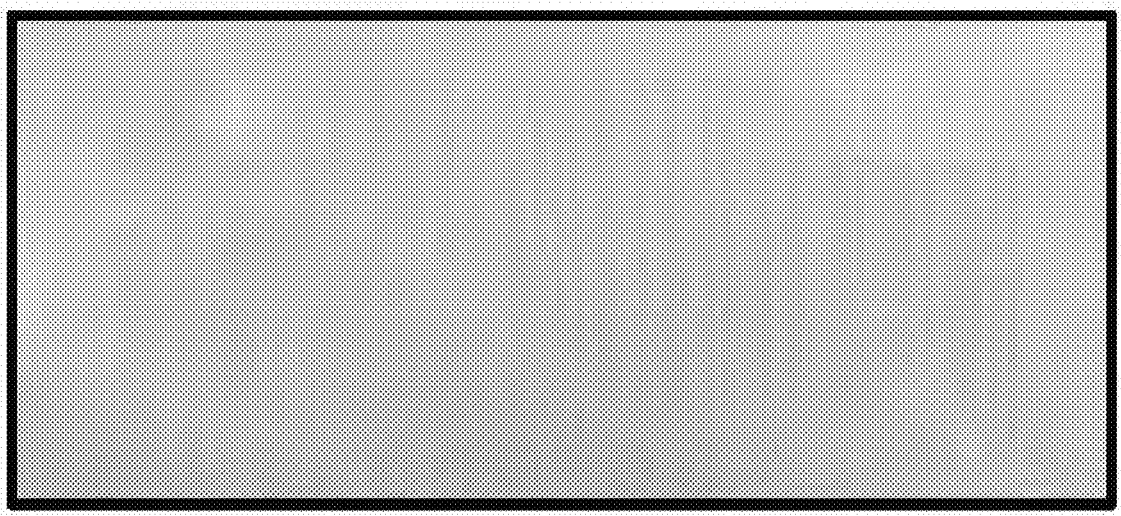
FIG. 17B is an exemplary image of a group of barcodes printed by a Dimatix Materials Printer DMP-2831 using bismuth neodecanoate ink on glossy paper, in accordance with some embodiments.

FIG. 17B is an exemplary image of a group of barcodes printed by a Dimatix Materials Printer DMP-2831 using bismuth neodecanoate ink on glossy paper.

Figure 18A:
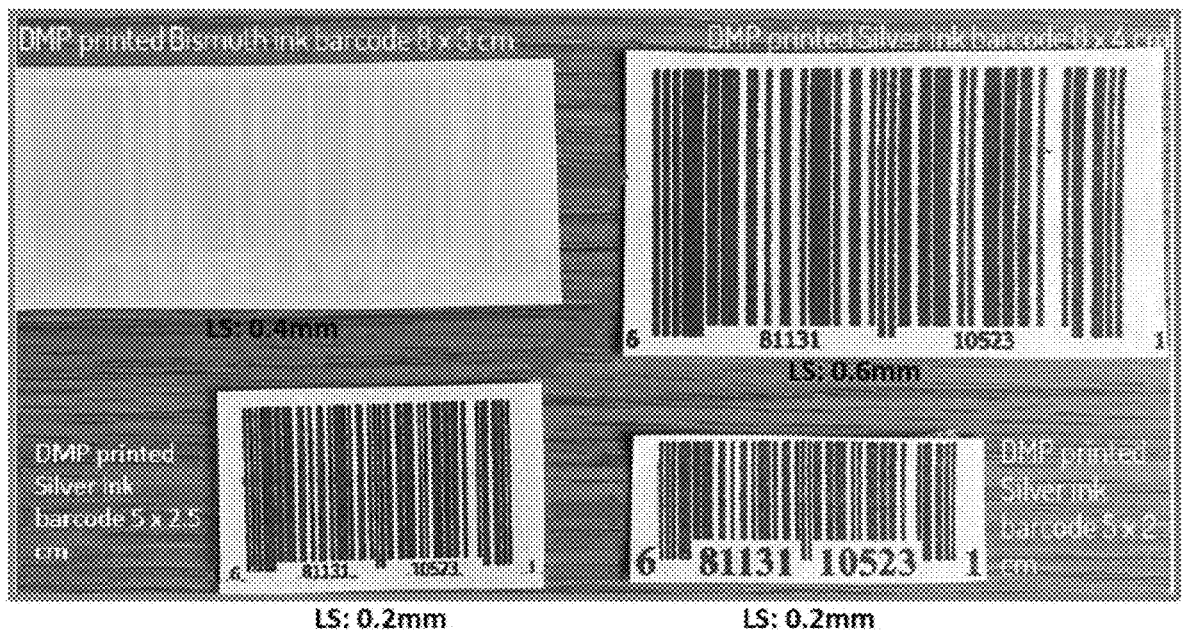
FIG. 18A is an exemplary image of a group of barcodes printed by a Dimatix Materials Printer DMP-2831 using bismuth neodecanoate and/or silver inks on A4 paper, in accordance with some embodiments.

FIG. 18A is an exemplary image of a group of barcodes printed by a Dimatix Materials Printer DMP-2831 using bismuth neodecanoate and/or silver inks on A4 paper.

Figure 18B:
FIG. 18B is an exemplary image of a group of barcodes printed by a Dimatix Materials Printer DMP-2831 using silver ink on glossy paper, in accordance with some embodiments.

FIG. 18B is an exemplary image of a group of barcodes printed by a Dimatix Materials Printer DMP-2831 using silver ink on glossy paper.

Figure 19:
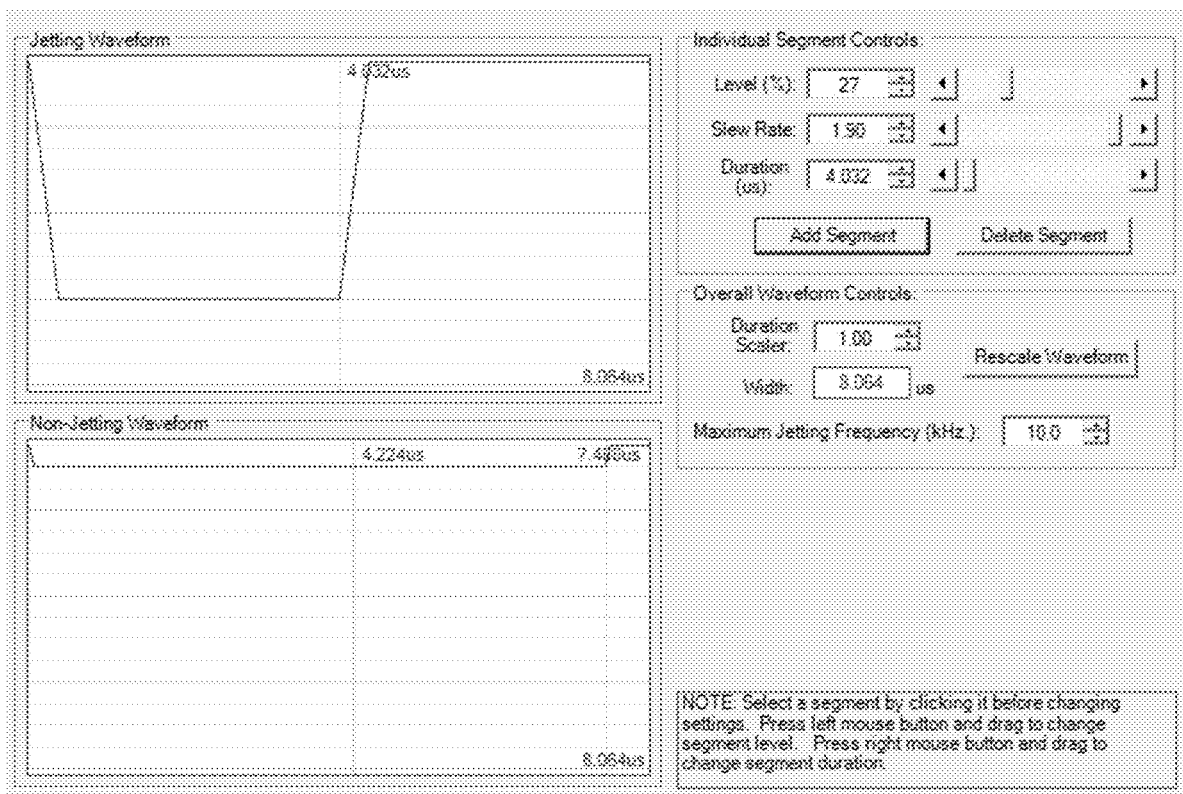
FIG. 19 is an image of a screen capture depicting an exemplary waveform used for printing using bismuth neodecanoate ink, in accordance with some embodiments.
Figure 20:
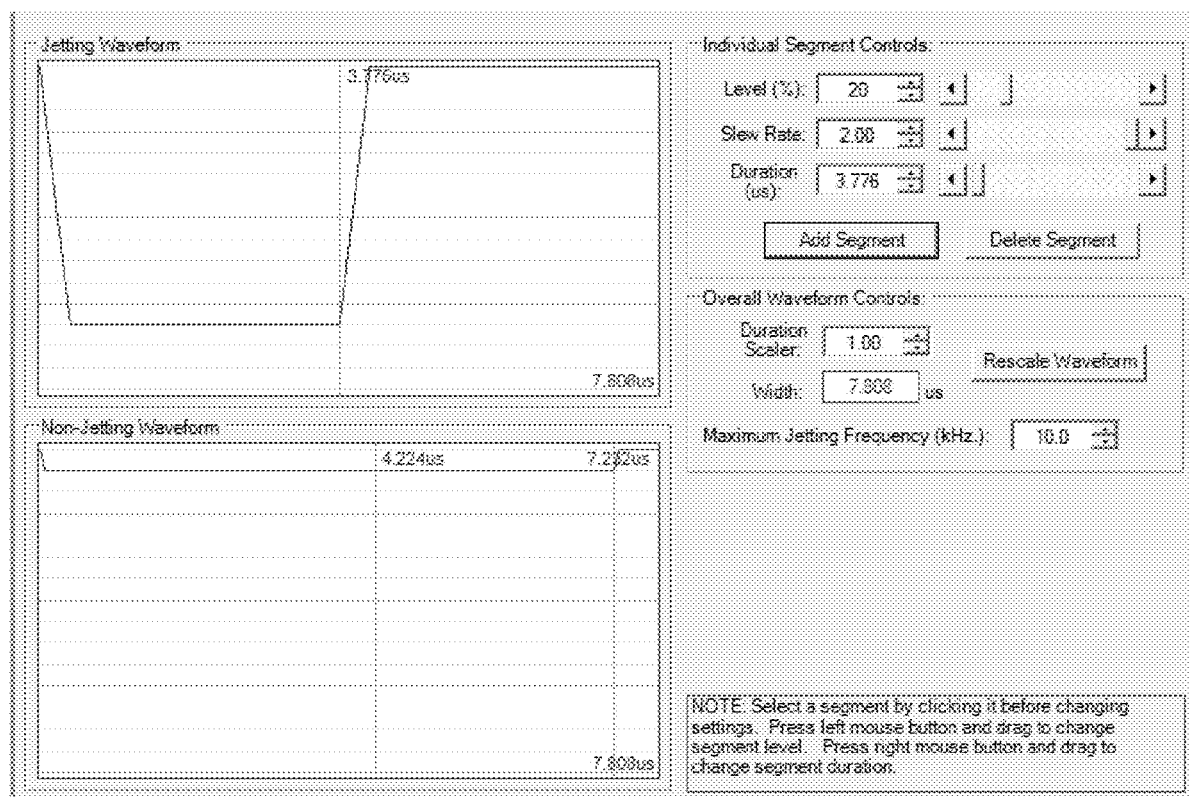
FIG. 20 is an image of a screen capture depicting an exemplary waveform used for silver ink, in accordance with some embodiments.

FIG. 19 is an image of a screen capture depicting an exemplary waveform used for printing using bismuth neodecanoate ink. FIG. 20 is an image of a screen capture depicting an exemplary waveform used for silver ink. These screen captures illustrate various exemplary printing parameters such as level, slew rate, duration, duration scaler, width, and maximum jetting frequency for some embodiments.

This specification and drawings illustrate several embodiments of radiopaque ink formations and various uses thereof. In some embodiments, a radiopaque ink composition comprises: a polymer matrix having an average molecular weight of from about 1,000 g/mol to about 50,000 g/mol; and a radiopaque compound dispersed within the polymer matrix, the radiopaque compound comprising one or more elements having an atomic number of 53 or greater in an amount effective to render the ink composition radiopaque.

In some embodiments, a system for identifying an object comprises: an object having disposed thereon an identifying marking formed of a radiopaque ink composition, the radiopaque ink composition comprising: a polymer matrix having an average molecular weight of from about 1,000 g/mol to about 50,000 g/mol; and a radiopaque compound dispersed within the polymer matrix, the radiopaque compound comprising one or more elements having an atomic number of 53 or greater in an amount effective to render the ink composition radiopaque; a radiographic imaging device configured to irradiate an object with x-ray radiation and detect reflected x-ray radiation; a display device; and a control circuit communicatively coupled to the radiographic imaging device, and the display device via a network, the control circuit configured to: cause the radiographic imaging device to irradiate the object; receive, from the radiographic imaging device, image data associated with the object; process the image data to generate an x-ray image based on detected x-ray radiation, wherein the x-ray image shows the identifying marking of the object; cause the display device to display the x-ray image showing the identifying marking of the object; and identify the object based on the identifying marking of the object shown in the x-ray image.

In some embodiments, a method of identifying an object comprises: causing, by a control circuit, a radiographic imaging device to irradiate an object with x-ray radiation and detect reflected x-ray radiation, the object having disposed thereon an identifying marking formed of a radiopaque ink composition, the radiopaque ink composition comprising: a polymer matrix having an average molecular weight of from about 1,000 g/mol to about 50,000 g/mol; and a radiopaque compound dispersed within the polymer matrix, the radiopaque compound comprising one or more elements having an atomic number of 53 or greater in an amount effective to render the ink composition radiopaque; receiving, by the control circuit from the radiographic imaging device, image data associated with the object; processing, by the control circuit, the image data to produce an x-ray image, wherein the x-ray image shows the identifying marking of the object; causing, by the control circuit, a display device to display the x-ray image showing the identifying marking of the object; and identifying, by the control circuit, the object based on the identifying marking of the object shown in the x-ray image.

In some embodiments, a radiopaque ink composition comprises: a solvent; and a plurality of nanoparticles having an average diameter from about 5 nm to about 300 nm suspended in the solvent, each nanoparticle comprising at least 50,000 atoms having an atomic number of 53 or greater, wherein the plurality of nanoparticles are present in the solvent in an amount effective to render the ink composition radiopaque.

In some embodiments, a system for identifying an object comprises: an object having disposed thereon an identifying marking formed of a radiopaque ink composition, the radiopaque ink composition comprising: a solvent; and a plurality of nanoparticles having an average diameter from about 5 nm to about 300 nm suspended in the solvent, each nanoparticle comprising at least 50,000 atoms having an atomic number of 53 or greater, wherein the plurality of nanoparticles are present in the solvent in an amount effective to render the ink composition radiopaque; a radiographic imaging device configured to irradiate an object with x-ray radiation and detect reflected x-ray radiation; a display device; and a control circuit communicatively coupled to the radiographic imaging device, and the display device via a network, the control circuit configured to: cause the radiographic imaging device to irradiate the object; receive, from the radiographic imaging device, image data associated with the object; process the image data to generate an x-ray image based on detected x-ray radiation, wherein the x-ray image shows the identifying marking of the object; cause the display device to display the x-ray image showing the identifying marking of the object; and identify the object based on the identifying marking of the object shown in the x-ray image.

In some embodiments, a method of identifying an object comprises: causing, by a control circuit, a radiographic imaging device to irradiate an object with x-ray radiation and detect reflected x-ray radiation, the object having disposed thereon an identifying marking formed of a radiopaque ink composition, the radiopaque ink composition comprising: a solvent; and a plurality of nanoparticles having an average diameter from about 5 nm to about 300 nm suspended in the solvent, each nanoparticle comprising at least 50,000 atoms having an atomic number of 53 or greater, wherein the plurality of nanoparticles are present in the solvent in an amount effective to render the ink composition radiopaque; receiving, by the control circuit from the radiographic imaging device, image data associated with the object; processing, by the control circuit, the image data to produce an x-ray image, wherein the x-ray image shows the identifying marking of the object; causing, by the control circuit, a display device to display the x-ray image showing the identifying marking of the object; and identifying, by the control circuit, the object based on the identifying marking of the object shown in the x-ray image.

In some embodiments, a system for printing radiopaque ink compositions on substrates comprises: a substrate; an ink printing device comprising: a cartridge containing a radiopaque ink composition, the radiopaque ink composition comprising one of: (i) a polymer matrix having an average molecular weight of from about 1,000 g/mol to about 50,000 g/mol, and a radiopaque compound dispersed within the polymer matrix, the radiopaque compound comprising one or more elements having an atomic number of 53 or greater in an amount effective to render the ink composition radiopaque; and (ii) a plurality of nanoparticles having an average diameter from about 5 nm to about 300 nm suspended in a solvent, each nanoparticle comprising at least 50,000 atoms having an atomic number of 53 or greater, wherein the plurality of nanoparticles are present in the solvent in an amount effective to render the ink composition radiopaque; and a control circuit communicatively coupled to the ink printing device, the control circuit configured to: receive an object identifier; select one or more printing parameters; and cause the ink printing device to deposit the radiopaque ink composition on the substrate using the selected one or more printing parameters to form on the substrate a machine readable code associated with the object identifier.

In some embodiments, a method of printing radiopaque ink compositions on substrates comprises: providing an ink printing device comprising: a cartridge containing a radiopaque ink composition, the radiopaque ink composition comprising one of: (i) a polymer matrix having an average molecular weight of from about 1,000 g/mol to about 50,000 g/mol, and a radiopaque compound dispersed within the polymer matrix, the radiopaque compound comprising one or more elements having an atomic number of 53 or greater in an amount effective to render the ink composition radiopaque; and (ii) a plurality of nanoparticles having an average diameter from about 5 nm to about 300 nm suspended in a solvent, each nanoparticle comprising at least 50,000 atoms having an atomic number of 53 or greater, wherein the plurality of nanoparticles are present in the solvent in an amount effective to render the ink composition radiopaque; receiving, by the control circuit, an object identifier; selecting, by the control circuit, one or more printing parameters; and causing, by the control circuit, the ink printing device to deposit the radiopaque ink composition on a substrate using the selected one or more printing parameters to form on the substrate a machine-readable code associated with the object identifier.

In some embodiments, a system for printing radiopaque ink compositions on substrates comprises: a substrate; an ink printing device comprising a cartridge containing a radiopaque ink composition; a control circuit communicatively coupled to the ink printing device, the control circuit configured to: receive an object identifier to identify a product for commercial sale; select one or more printing parameters; and cause the ink printing device to deposit the radiopaque ink composition on the substrate using the selected one or more printing parameters to form on the substrate a machine-readable code associated with the object identifier; and a product for commercial sale having the substrate applied thereto and configured for storage in a retail facility Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A radiopaque ink composition comprising:
    a polymer matrix having an average molecular weight of from about 1,000 g/mol to about 50,000 g/mol, the polymer matrix comprising a mixture of linear short chain polyethyleneimine and branched polyethyleneimine; and
    a radiopaque compound solubilized in the polymer matrix, the radiopaque compound comprising tungsten hexachloride in an amount effective to render the ink composition radiopaque.

2. The radiopaque ink composition of claim 1, wherein the radiopaque ink composition has a viscosity up to about 12 centipoise at ambient temperature.

3. A label comprising the radiopaque ink composition of claim 1 printed on a substrate.

4. A system for identifying an object, the system comprising:
    an object having disposed thereon an identifying marking formed of a radiopaque ink composition, the radiopaque ink composition comprising:
        a polymer matrix having an average molecular weight of from about 1,000 g/mol to about 50,000 g/mol, the polymer matrix comprising a mixture of linear short chain polyethyleneimine and branched polyethyleneimine; and
        a radiopaque compound solubilized in the polymer matrix, the radiopaque compound comprising tungsten hexachloride in an amount effective to render the ink composition radiopaque;
    a radiographic imaging device configured to irradiate an object with x-ray radiation and detect reflected x-ray radiation;
    a display device; and
    a control circuit communicatively coupled to the radiographic imaging device, and the display device via a network, the control circuit configured to:
        cause the radiographic imaging device to irradiate the object;
        receive, from the radiographic imaging device, image data associated with the object;
        process the image data to generate an x-ray image based on detected x-ray radiation, wherein the x-ray image shows the identifying marking of the object;
        cause the display device to display the x-ray image showing the identifying marking of the object; and
        identify the object based on the identifying marking of the object shown in the x-ray image.

5. The system of claim 4, further comprising a plurality of objects arranged in a manner such that an identifying marking of the object is visually obscured by another object.

6. The system of claim 5, wherein a radiodensity of the other object is lower than a radiodensity of the radiopaque ink composition.

7. The system of claim 4, wherein the object is a medical implant disposed in a subject.

8. The system of claim 4, wherein the object is a consumer product, and the radiographic imaging device comprises a handheld device configured to be operated by an associate in a retail facility.

9. The system of claim 4, wherein the object is a consumer product in a retail facility, and the radiographic imaging device is associated with a point-of-sale terminal or an autonomous robot in the retail facility.

10. The system of claim 4, wherein the radiopaque ink composition is disposed directly on at least one of the object or a packaging of the object.

11. The system of claim 4, wherein the radiopaque ink composition is disposed on a printed label, which is affixed to at least one of the object or a packaging of the object.

12. The system of claim 4, further comprising a database associating objects with respective identifying markings, wherein the control circuit is configured to identify the object by reading the identifying marking of the object in the x-ray image, and querying the database to obtain a match between the identifying marking and the associated object.

13. A method of identifying an object, the method comprising:
- causing, by a control circuit, a radiographic imaging device to irradiate an object with x-ray radiation and detect reflected x-ray radiation, the object having disposed thereon an identifying marking formed of a radiopaque ink composition, the radiopaque ink composition comprising:
  - a polymer matrix having an average molecular weight of from about 1,000 g/mol to about 50,000 g/mol, the polymer matrix comprising a mixture of linear short chain polyethyleneimine and branched polyethyleneimine; and
  - a radiopaque compound solubilized in the polymer matrix, the radiopaque compound comprising tungsten hexachloride in an amount effective to render the ink composition radiopaque;
- receiving, by the control circuit from the radiographic imaging device, image data associated with the object;
- processing, by the control circuit, the image data to produce an x-ray image, wherein the x-ray image shows the identifying marking of the object;
- causing, by the control circuit, a display device to display the x-ray image showing the identifying marking of the object; and
- identifying, by the control circuit, the object based on the identifying marking of the object shown in the x-ray image.

14. The method of claim 13, wherein a plurality of objects are arranged in a manner such that an identifying marking of the object is visually obscured by another object.

15. The method of claim 13, wherein a radiodensity of the other object is lower than a radiodensity of the radiopaque ink composition.

16. The method of claim 13, wherein the object is a medical implant disposed in a subject.

17. The method of claim 13, wherein the object is a consumer product, and the radiographic imaging device comprises handheld device configured to be operated by an associate in a retail facility.

18. The method of claim 13, wherein the object is a consumer product in a retail facility, and the radiographic imaging device is associated with a point-of-sale terminal or an autonomous robot in the retail facility.

19. The method of claim 13, wherein the radiopaque ink composition is disposed directly on at least one of the object or a packaging of the object.

20. The method of claim 13, wherein the radiopaque ink composition is disposed on a printed label, which is affixed to at least one of the object or a packaging of the object.

* * * * *